United States Patent
Ingale et al.

(10) Patent No.: US 12,047,831 B2
(45) Date of Patent: Jul. 23, 2024

(54) IRAT RRC RE-ESTABLISHMENT PROCEDURE AND IRAT RESUME PROCEDURE

(71) Applicant: Samsung Electronics Co., Ltd., Suwon-si (KR)

(72) Inventors: Mangesh Abhimanyu Ingale, Bangalore (IN); Fasil Abdul Latheef, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 17/310,956

(22) PCT Filed: Mar. 2, 2020

(86) PCT No.: PCT/KR2020/002966
§ 371 (c)(1),
(2) Date: Sep. 1, 2021

(87) PCT Pub. No.: WO2020/180071
PCT Pub. Date: Sep. 10, 2020

(65) Prior Publication Data
US 2023/0145867 A1    May 11, 2023

(30) Foreign Application Priority Data
Mar. 1, 2019 (IN) .............................. 201941008171
Feb. 26, 2020 (IN) .............................. 201941008171

(51) Int. Cl.
*H04W 36/30* (2009.01)
*H04W 36/14* (2009.01)
*H04W 76/19* (2018.01)

(52) U.S. Cl.
CPC ......... *H04W 36/305* (2018.08); *H04W 36/14* (2013.01); *H04W 76/19* (2018.02)

(58) Field of Classification Search
CPC ... H04W 36/305; H04W 36/14; H04W 76/19; H04W 36/0033; H04W 36/0079; H04W 88/06
See application file for complete search history.

(56) References Cited

U.S. PATENT DOCUMENTS

| | | | |
|---|---|---|---|
| 2012/0224470 A1* | 9/2012 | Jeong | H04L 43/0811 370/221 |
| 2013/0183974 A1* | 7/2013 | Johansson | H04W 36/08 455/436 |

(Continued)

FOREIGN PATENT DOCUMENTS

| | | |
|---|---|---|
| EP | 3448114 A1 | 2/2019 |
| WO | 2017204539 A1 | 11/2017 |

OTHER PUBLICATIONS

International Search Report and Written Opinion of the International Searching Authority in connection with International Application No. PCT/KR2020/002966 issued Jun. 12, 2020, 8 pages.

(Continued)

*Primary Examiner* — Michael K Phillips

(57) ABSTRACT

Embodiments herein achieve a method for handling a RLF in a wireless communication system by a UE. The method includes detecting the RLF at the UE associated with a first cell that is associated with a first RAT. Further, the method includes selecting a second cell, associated with a second RAT, by performing a cell selection procedure. Further, the method includes detecting that a 5GC is connected. Further, the method includes determining whether a timer is running in the UE. Further, the method includes performing an IRAT RRC re-establishment procedure on the second cell when the RLF is occurred on the first cell associated with the first RAT in response to determining that the timer is running in the UE.

13 Claims, 18 Drawing Sheets

(56) References Cited

U.S. PATENT DOCUMENTS

| 2014/0051443 | A1 | 2/2014 | Diachina et al. |
| 2015/0245407 | A1 | 8/2015 | Johansson et al. |
| 2018/0092006 | A1* | 3/2018 | Sitton .................. H04W 76/19 |
| 2019/0089579 | A1* | 3/2019 | Sang ..................... H04W 40/16 |
| 2019/0150039 | A1* | 5/2019 | Raghunathan ........ H04W 76/19 |
| | | | 370/331 |
| 2020/0344019 | A1* | 10/2020 | Da Silva ................. H04L 1/203 |
| 2021/0176692 | A1* | 6/2021 | Rugeland .............. H04W 48/20 |

OTHER PUBLICATIONS

3rd Generation Partnership Project; Technical Specification Group Radio Access Network; NR; Radio Resource Control (RRC) protocol specification (Release 15) 3GPP TS 38.331 V15.4.0; Dec. 2018, 474 pages.

3rd Generation Partnership Project; Technical Specification Group Radio Access Network; NR; User Equipment (UE) procedures in Idle mode and RRC Inactive state (Release 15) 3GPP TS 38.304 V15.2.0, 28 pages, Dec. 2018.

* cited by examiner

IRAT RRC RE-ESTABLISHMENT PROCEDURE AND IRAT RESUME PROCEDURE

CROSS-REFERENCE TO RELATED APPLICATIONS

This application is a 371 of International Application No. PCT/KR2020/002966, filed Mar. 2, 2020, which claims priority to Indian Patent Application No. 201941008171 filed Mar. 1, 2019, and Indian Patent Application No. 201941008171 filed Feb. 26, 2020, the disclosures of which are herein incorporated by reference in their entirety.

BACKGROUND

1. Field

The present disclosure relates to a wireless communication system, and more specifically related to a system and a method for handling a radio link failure (RLF) in the wireless communication system during an Inter Radio Access Technology (IRAT) Radio Resource Control (RRC) re-establishment procedure and an IRAT resume procedure.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

The principal object of the embodiments herein is to provide a system and method for handling a RLF (Radio Link Failure) in a wireless communication system during an Inter Radio Access Technology (IRAT) Radio Resource Control (RRC) re-establishment procedure.

The principal object of the embodiments herein is to provide a system and method for handling an inactive state of the UE in the wireless communication system during an IRAT resume procedure.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1A:
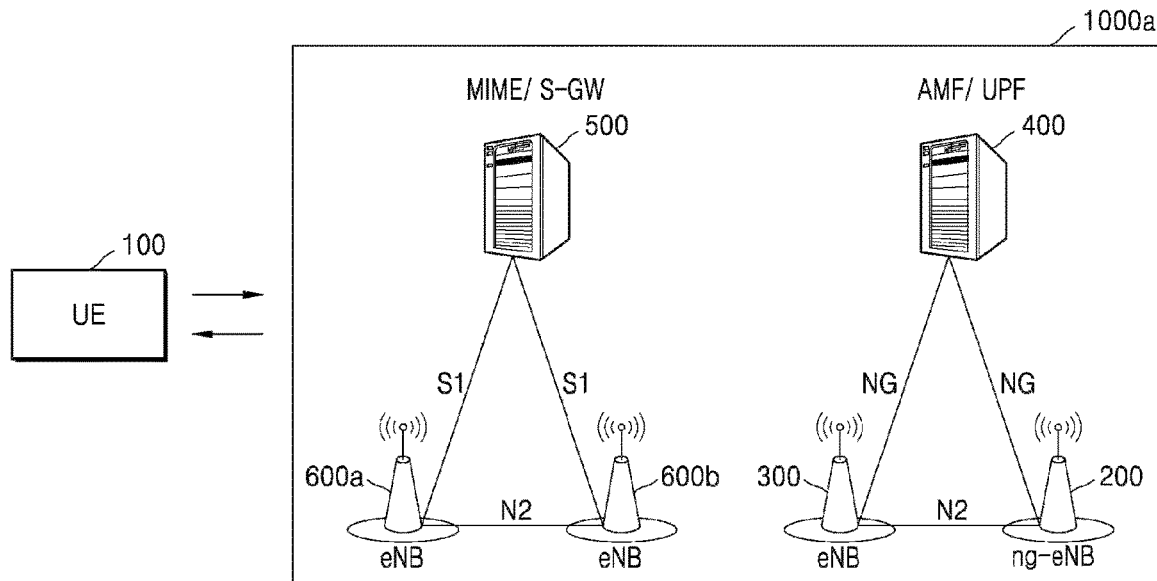
FIG. 1A illustrates an early NR and LTE deployments according to embodiments of the present disclosure.

Accordingly, the embodiment discloses a method for handling a radio link failure (RLF) in a wireless communication system. The method may include detecting by a UE, the RLF, at the UE associated with a first cell in the wireless communication system. The first cell may be associated with a first RAT. Further, the method may include selecting, by the UE, a second cell in the wireless communication system by performing a cell selection procedure in response to detecting RLF at the UE on the first cell associated with a first RAT. The second cell may be associated with a second RAT. Further, the method may include detecting, by the UE, that a 5GC is connected. Further, the method may include determining, by the UE, that a timer is running in the UE on the second RAT. The timer may be configured and started on the first RAT and the timer is continued or expired on the second RAT. Therefore, T311 on second RAT should inherit the remainder of time from T311 running of first RAT. If on second RAT, it T311 is still running, then UE can initiate re-establishment request. Further, the method may include performing an Inter Radio Access Technology (IRAT) Radio Resource Control (RRC) re-establishment procedure on the second cell when the RLF is occurred on the first cell associated with the first RAT in response to determining that the timer is running in the UE.

In one embodiment, each of the first RAT and the second TAT is one of a 4G RAT and a 5G RAT.

In one embodiment, the first RAT may be a 5G RAT and the second RAT is a 4G RAT.

In another embodiment, the first RAT may be a 4G RAT and the second RAT is a 5G RAT.

In one embodiment, detecting, by the UE, that the 5GC is connected may include determining that the second cell is connected to the 5GC when the first RAT is a 5G RAT and the second RAT is a 4G RAT.

In another embodiment, detecting, by the UE, that the 5GC is connected may include determining that the first cell on which the RLF occurred is connected to the 5GC when the first RAT is a 4G RAT and the second RAT is a 5G RAT.

In one embodiment, performing the IRAT RRC re-establishment procedure on the second cell may include sending by the UE, a RRC re-establishment request message to the second cell, wherein the RRC re-establishment request message comprises a RAT type identifier to indicate the RAT on which the UE encountered RLF, identifying by the second cell, the first RAT based on the RAT TYPE indicated by the UE, and sending, by the second cell, the retrieve UE context request message for retrieving a UE context to the first cell, and receiving, by the second cell, RETRIEVE UE CONTEXT response message comprising the retrieved UE context from the first cell based on the RRC re-establishment request message.

In one embodiment, the timer can be a T311.

In one embodiment, the UE may inherit on the second cell, the remaining value of T311 from the first cell.

Accordingly, the embodiment discloses a method for handling an INACTIVE state in a wireless communication system. The method may include receiving, by a UE, a RRC release message from a network indicating transition to an inactive state of the UE that is associated with a first cell in the wireless communication system. The first cell may be associated with a first RAT. Further, the method may include selecting, by the UE, a second cell in the wireless communication system by performing a cell reselection procedure while the UE is in the inactive state associated with the first cell in the wireless communication system. The second cell may be associated with a second RAT. Further, the method may include determining that the first cell and the second cell belong to a same RAN notification area. Further, the method may include performing an IRAT resume procedure on the second RAT in the same RAN notification area based on the cell reselection procedure when the inactive state of the UE is occurred on the first cell associated with the first RAT.

In an embodiment, the UE may remain in INACTIVE state by determining that the first cell and the second cell belong to the same RAN notification area.

In an embodiment, the IRAT resume procedure may be performed by sending, by the UE, a RRC resume request to the second cell in response to determining that the timer is running in the UE, sending, by the second cell, a retrieve UE context request to the first cell based on the RRC resume request, sending, by the first cell, a retrieve UE context response to the second cell based on the UE context request, sending, by the second cell, the RRC resume to the UE, and sending, by the UE, the RRC resume complete to the second cell.

In an embodiment, cells from first RAT and second RAT can belong to the same RAN notification area if they are connected to 5GC.

In an embodiment, the IRAT resume procedure may indicate that on selecting the second cell, the UE does not go to an idle state and does not discard and retains inactive AS context associated with the first cell.

In an embodiment, the first RAT may be a 5G RAT and the second RAT is a 4G RAT.

In another embodiment, the first RAT may be a 4G RAT and the second RAT is a 5G RAT.

In an embodiment, the timer can be a T380.

In an embodiment, the UE may inherit, on the second cell, the remaining value of T380 from the first cell.

Accordingly, the embodiment discloses a UE for handling a RLF in a wireless communication system. The UE includes a memory, a transceiver and at least one processor coupled with the transceiver. The at least one processor may detect a RLF at the UE associated with a first cell in the wireless communication system. The first cell may be associated with a first RAT. Further, the at least one processor may select a second cell in the wireless communication system by performing a cell selection procedure in response to detecting the RLF at the UE associated with the first cell in the wireless communication system. The second cell may be associated with a second RAT. Further, the at least one processor may detect that a 5GC is connected. Further, the at least one processor may determine that a timer is running in the UE on the second RAT. The timer may be configured and started on the first RAT and the timer may be continued or expired on the second RAT. Therefore, T311 on second RAT should inherit the remainder of time from T311 running of first RAT. If on second RAT, it T311 is still running, then UE can initiate re-establishment request. Further, the at least one processor may perform an IRAT RRC re-establishment procedure on the second cell in response to determining that the timer is running in the UE, when the RLF is occurred on the first cell associated with the first RAT.

Accordingly, the embodiment discloses a UE for handling an inactive state in a wireless communication system. The UE may include a memory, a transceiver, and at least one processor coupled with the transceiver. The at least one processor may be configured to receive a RRC release message from a network indicating transition to an inactive state of the UE that is associated with a first cell in the wireless communication system. The first cell may be associated with a first RAT. Further, the at least one processor may be configured to select a second cell in the wireless communication system by performing a cell reselection procedure while the UE is in the inactive state associated with the first cell in the wireless communication system. The second cell may be associated with a second RAT. Further, the at least one processor may be configured to determine that the first cell and the second cell belonging to a same RAN notification area. Further, the at least one processor may be configured to perform an IRAT resume procedure on the second RAT in the same RAN notification area based on the cell reselection procedure when the inactive state of the UE is occurred on the first cell associated with the first RAT.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "processor" or "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances, such definitions apply to prior as well as future uses of such defined words and phrases.

In recent years, several advancements in wireless communication technologies has been made in order to meet the growing broadband demand and the advent of new applications and services. The second generation of wireless communication system was developed to provide voice service in a mobile environment. The third generation enhanced this further with the support of data along with voice in a mobile environment. In recent years, the fourth generation wireless communication system has been developed to provide high speed broadband data in mobility environment. However, the advancements in fourth generation communication system (Long term evolution—LTE) suffers from lack of resources and methods to meet the growing demand for broadband and new use cases. Therefore, the fourth generation communication system is being further advanced and also the fifth generation (New Radio—NR) is being developed in order to meet this growing need for broadband with enhanced mobile broadband (eMBB) while also supporting new use cases like ultra-reliable low latency commination (URLLC) and massive machine type communication (mMTC).

The NR is an Orthogonal Frequency-Division Multiplexing (OFDM)-based air interface designed to support the wide variation of 5G device-types, services, deployments and spectrum. A network monitors the device behavior and provides the necessary resources to a mobile device (e.g., User Equipment (UE)) to perform any operation it requires (data—uplink or downlink, calls etc.). The signal strength and quality experienced by the mobile device varies according to the proximity of the mobile device with the gNB. The UE's near the cell are expected to have a better signal condition compared to the ones which are far from the gNB i.e. cell edge situation.

Network RAN Node—gNodeB in the NR (gNB)/eNB in the LTE always maintains a context on the mobile devices that are in active Radio Resource Control (RRC) connection with it. At any point of time, the gNB can handover a mobile device/User equipment (UE) from its control (source cell) to another gNB or another cell (Target cell), thus transferring the entire context of the particular device to the target cell. This decision is taken by the network optionally based on assistance received from the UE, with the help of measurement reports about neighbor cells. (i.e., gNB configures the mobile device to measure the signal condition of the serving cell and neighboring cells that may belong to a different gNB). There is a specific measurement criteria, and a specific reporting criteria to the network, both of which are configured by the serving gNB itself. Due to multiple reasons like weak signal condition, heavy load on serving gNB etc., the serving gNB can handover the device to the neighbor cell or target gNB and this could be done based on assistance received from the UE in form of measurement reports.

The UE is continuously monitoring the quality of its radio link to ensure that the link is sufficiently in good conditions to successfully receive any transmission from the network and to successfully make transmissions to the network. When the UE identifies that that link quality has gone weak, the radio resource management (RRM) functionality performing radio link monitoring (RLM) at a PHY layer sends out of sync indications to the higher layers (i.e. RRC layer) thereby indicating the higher layer about the degradation in radio link quality. Once the link degradation condition reaches the allowed limit i.e. a configured threshold condition, the UE enters a state of outage i.e. poor radio conditions where the UE experience Qout (out of sync indication from a radio resource manager) due to high block error rate. The current specifications provision the use of a configured T310 timer in this state. The UE declares radio link failure (RLF) on the expiry of this timer T310 and initiates cell selection procedure to attempt recovery.

The UE declares the RLF before the network may identify the failure that the UE has encountered. The network (i.e., RAN node) identifies that a certain UE connected to it has encountered a radio link failure based on network implementation specific triggers. This may include a timer equivalent to T310 on the network side based on a block error rate observed on the uplink channels or based on absence of configured periodic reports like CSI from the UE at the expected occasions or any other trigger conditions that the network may use to determine the link failure at the UE. Once the network has identified that the UE may have encountered with a radio link failure, the serving network (i.e., RAN node) saves the UE context. This context may later be transferred to the target RAN node on which the UE attempts for RLF recovery based on network deployment an connectivity or routing path availability between the source node on which the UE encountered radio link failure and the target RAN node on which the UE attempts for RLF recovery.

Once UE declares RLF, the UE initiates cell section procedure in order to attempt for recovery of RRC connection or radio link. However, the UE cannot attempt for recovery for as long as it may need. The recovery has to be performed within a network configured timer T311, for which duration at least, the network saves the UE context. Therefore, T311 is started at the UE when re-establishment procedure or RLF recovery procedure is initiated. When the T311 expires, the RLF recovery failure is declared. When the T311 is running, the UE performs cell selection procedure in order to find and select a suitable cell to send RRC re-establishment message to the network. The cell search or cell selection is performed on the source radio access network (RAT) on which the UE encountered RLF. If a suitable cell on the same RAT is detected, the UE sends RRC re-establishment message to the network to recovery from RLF. If there are no suitable cells on the same RAT, the UE performs cell selection and cell search procedure on another RAT as requested by upper layers. If a suitable cell is found on other RAT, the UE declares RLF recovery failure and transitions to RRC IDLE state. There is no RLF recovery procedure possible in this scenario and the UE request for new connection establishment with the network. Therefore, if UE encounters RLF on the NR, it can performed re-establishment or RLF recovery only on the same or different NR cell. If the UE detects only LTE cell in that area and performs cell selection on LTE, re-establishment of RRC connection is not possible and RLF recovery failure is declared. The examples illustrated for RLF recovery in the LTE and the NR is only for illustration purposes and the solutions are not limited to it.

The embodiments herein achieve a method for handling a RLF in a wireless communication system. The method may include detecting, by a UE, the RLF at the UE associated with a first cell in the wireless communication system. The first cell may be associated with a first RAT. Further, the method may include selecting, by the UE, a second cell in the wireless communication system by performing a cell selection procedure in response to detecting the RLF at the UE associated with the first cell in the wireless communication system. The second cell may be associated with a second RAT. Further, the method may include detecting, by the UE, that a 5GC is connected. Further, the method may include determining, by the UE, whether a timer is running in the UE on the second RAT. The timer may be configured and started on the first RAT and the timer may be continued or expired on the second RAT. Therefore, T311 on second RAT should inherit the remainder of time from T311 running of first RAT. If on second RAT, it T311 is still running, then UE can initiate re-establishment request. Further, the method may include performing, by the UE, in response to determining that the timer is running in the UE, performing an Inter Radio Access Technology (IRAT) Radio Resource Control (RRC) re-establishment procedure on the second cell when the RLF is occurred on the first cell associated with the first RAT.

In an embodiment, the method can be used to handle an inactive state of the UE in a wireless communication system. The method may include receiving, by a UE, a RRC release message from a network indicating transition to an inactive state of the UE that is associated with a first cell in the wireless communication system. The first cell may be associated with a first RAT. Further, the method may include selecting, by the UE, a second cell in the wireless communication system by performing a cell reselection procedure while the UE is in the inactive state associated with the first cell in the wireless communication system. The second cell may be associated with a second RAT. Further, the method may include determining that the first cell and the second cell belong to a same RAN notification area. Further, the method may include performing an IRAT resume procedure on the second RAT in the same RAN notification area based on the cell reselection procedure when the inactive state of the UE is occurred on the first cell associated with the first RAT.

Referring now to the drawings, and more particularly to FIGS. 1B, 3A-6, and 8A-13, where similar reference characters denote corresponding features consistently throughout the figures, there are shown preferred embodiments.

FIG. 1A illustrates an early NR and LTE deployments according to embodiments of the present disclosure.

As shown in FIG. 1A, in current deployments of cellular networks, LTE RAN nodes (i.e. eNBs (600a and 600b)) may be connected to LTE Core Network or EPC and NR RAN nodes (i.e. gNBs (300)) may be connected to NR Core Network or 5GC. However, there are deployment and architecture option possible with the LTE RAN nodes connecting to 5GC i.e. ng-eNB (200) connected to the 5GC.

Figure 1B:
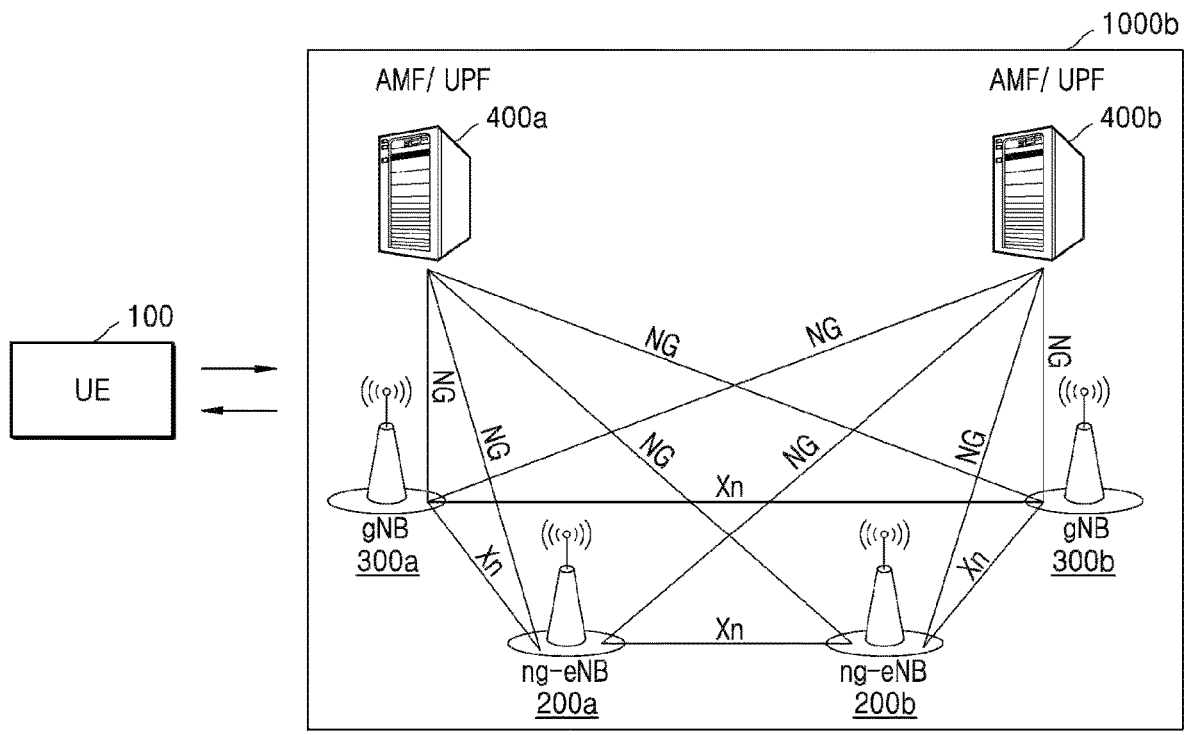
FIG. 1B illustrates expected future LTE and NR deployments, according to embodiments of the present disclosure.

FIG. 1B illustrates expected future LTE and NR deployments, according to embodiments of the present disclosure.

As shown in FIG. 1B, in future once NR deployments get mature/densified and widespread, the network operators as part of migration strategy may opt to maintain a single core network (5GC) and not maintain two separate core networks. Since both LTE and NR operations are possible on RAN nodes (i.e. ng-eNBs (200) and gNBs (300)) connected to the 5GC, it is possible that future network deployments have both LTE and NR cells connected only to 5GC. Therefore, it is beneficial if the UE (100) can successfully perform RRC re-establishment or RLF recovery procedures as well as resume procedures between these RATs or RAN nodes that are connected to a common 5GC core network. The proposals in this disclosure is related to provisioning and enabling the UE (100) (i.e. LTE/5GC capable and NR/5GC capable) and the network (i.e., RAN nodes) to perform inter RAT re-establishment when the concerned RAN nodes (i.e. ng-eNB (200) and gNB (300)) belonging to different RATs are connected to the same core network i.e. 5GC.

Method to perform Inter-RAT radio link failure recovery:

The UE (100) may encounter RLF when the serving cell signal conditions degrade and the UE (100) is unable to sustain minimal radio performance, and a suitable neighbor cell is not available or when there is a late handover to the neighbor cell. The late handover to the neighbor cell may either be due to delay in preparing the target cell for handover, or due to serving cell configuring sub-optimal measurement configuration to facilitate an early handover or even due to radio degradation of the serving channel. In such cases, the UE (100) may end up declaring an RLF eventually and initiates recovery procedure.

As per current provision on the 3GPP specifications, when there are no suitable cells on the serving RAT, the UE (100) may attempt to select a suitable cell on another RAT as requested by the upper layers. In a typical example, when the UE (100) declares the RLF on a NR serving cell and fails to find any suitable cell on the NR for RLF recovery, the UE (100) may then try to find a suitable cell LTE/EUTRA cell. On selecting the cell on a different RAT, the UE (100) transition to a RRC IDLE state and declares the RLF recovery failure. The UE (100) requests for new RRC connection establishment either for registering to the network if the current serving cell belongs to a registration area different from the registration area of the cell on which it encountered RLF, or for the service request. The UE behavior as per current 3GPP specifications is as illustrated in the FIG. 2A and the FIG. 2B.

Figure 2A:
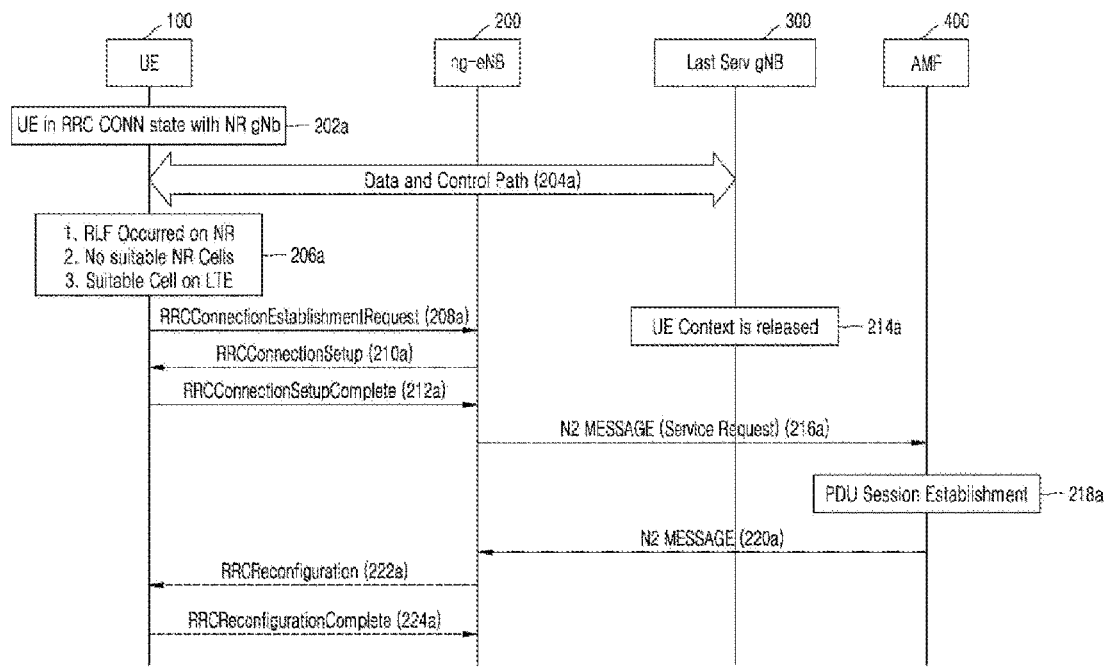
FIG. 2A is a sequence diagram based on current specification where IRAT re-establishment is not supported (RLF experienced on NR connected to 5GC) according to embodiments of the present disclosure.

FIG. 2A is a sequence diagram based on current specification where IRAT re-establishment is not supported (RLF experienced on NR connected to 5GC) according to embodiments of the present disclosure.

As shown in the FIG. 2A, at 202a, the UE (100) may be in the RRC CONNECT state with NR gNb. At 204a, the data and control path may be established between the UE (100) and the last serving gNB (300). At 206a, the UE (100) may determine that the RLF occurred on the NR, no suitable on the NR cells, and suitable cell found on the LTE. At 208a, the UE (100) may send the RRC connection establishment request to the ng-eNB 200. At 210a, the ng-eNB 200 may send the RRC connection setup to the UE (100). At 212a, the UE (100) may send the RRC connection setup complete to the ng-eNB 200. At 214a, the UE context may be released at the last Serving gNB 300. At 216a, the ng-eNB 200 may send the N2 message (service request) to the AMF (400). At 218a, the PDU session establishment may be occurred at the AMF (400). At 220a, the AMF (400) may send the N2 message to the ng-eNB 200. Based on the N2 message, at 222*a*, the ng-eNB 200 may send a RRC reconfiguration to the UE. At 224*a*, the UE (100) may send the RRC reconfiguration complete to the ng-eNB (200).

Figure 2B:
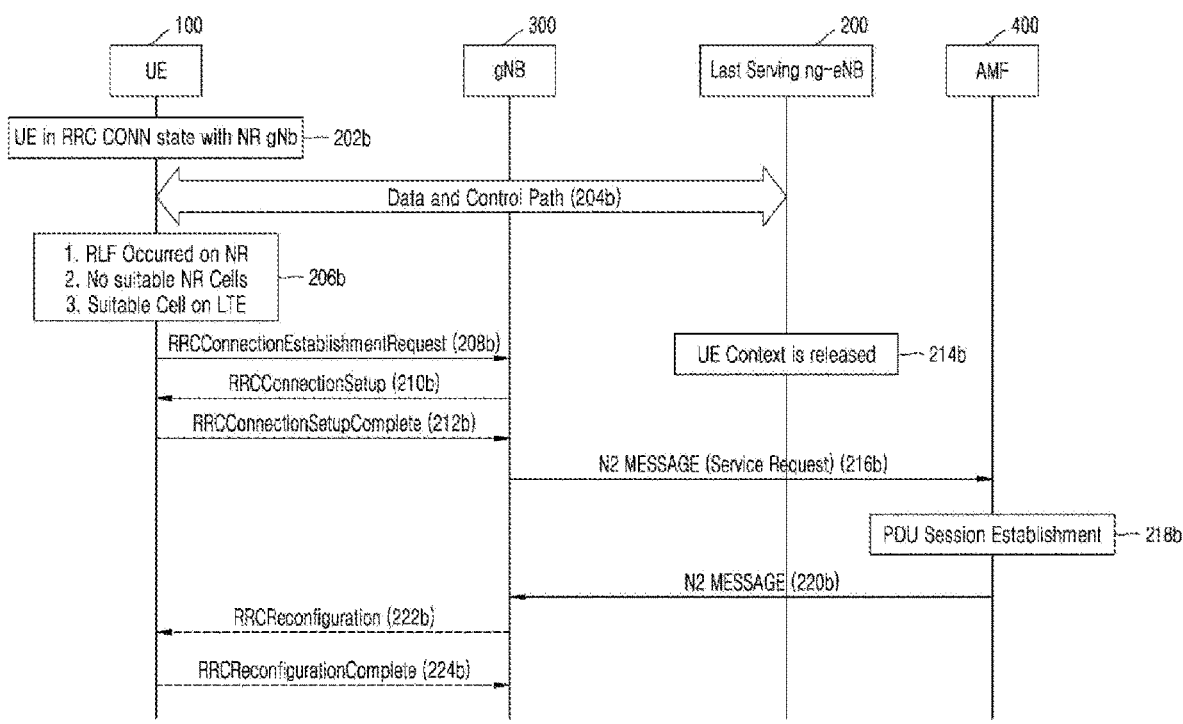
FIG. 2B is a sequence diagram based on current specification where IRAT re-establishment is not supported (RLF experienced on LTE connected to 5GC) according to embodiments of the present disclosure.

FIG. 2B is a sequence diagram based on current specification where IRAT re-establishment is not supported (RLF experienced on LTE connected to 5GC) according to embodiments of the present disclosure.

As shown in the FIG. 2B, at 202*b*, the UE (100) may be in the RRC CONNECT state with NR gNb. At 204*b*, the data and control path may be established between the UE (100) and the last serving ng-eNB (200). At 206*b*, the UE (100) may determine that the RLF occurred on the NR, no suitable on the NR cells, and suitable cell found on the LTE. At 208*b*, the UE (100) may send the RRC connection establishment request to the gNB (300). At 210*a*, the gNB (300) may send the RRC connection setup to the UE (100). At 212*b*, the UE (100) may send the RRC connection setup complete to the gNB (300). At 214*b*, the UE context may be released at the last Serving ng-eNB (200). At 216*a*, the gNB (300) may send the N2 message (service request) to the AMF (400). At 218*b*, the PDU session establishment may be occurred at the AMF (400). At 220*b*, the AMF (400) may send the N2 message to the gNB (300). Based on the N2 message, at 222*b*, the gNB (300) may send a RRC reconfiguration to the UE. At 224*a*, the UE (100) may send the RRC reconfiguration complete to the gNB (300).

In most deployments, the NR cells may be deployed as local hotspots to provide high data rate and distinct services in areas of interest and LTE serves the purpose of coverage layer providing basic services and better connectivity. The UE (100) transitions between this NR dense coverage area to NR sparse coverage area (Or LTE only coverage area) may be expected be more frequent and probable than the transitions between LTE and other legacy RATs. Therefore, it may be imperative that the UE services are not drastically affected due to these transitions. In order to achieve service continuity or minimize the service interruption due to RLF recovery, it may be proposed that the UE (100) performs the RRC re-establishment procedure to recover from RLF state when the UE (100) selects a suitable cell on a different RAT than the serving cell on which it experienced RLF i.e. the UE (100) can support re-establishment on the LTE cell when the RLF is experienced on the NR cell and vice versa. When the UE (100) declares the RLF on the NR cell (i.e., source RAT) and fails to detect the suitable cell on the same RAT, but finds the suitable LTE cell (i.e., target RAT) while T311 is running, the UE (100) may not transit to a RRC IDLE state and send RRC connection re-establishment request message to the network in attempt to recover from the RLF. If T311 is expired by the time, the UE (100) may select the suitable cell on the target RAT, the UE (100) may transit to the RRC IDLE state and the RLF failure recovery may fail. The sequence of procedures involved in performing IRAT re-establishment is as illustrated in the FIG. 3A and the FIG. 3B.

Figure 3A:
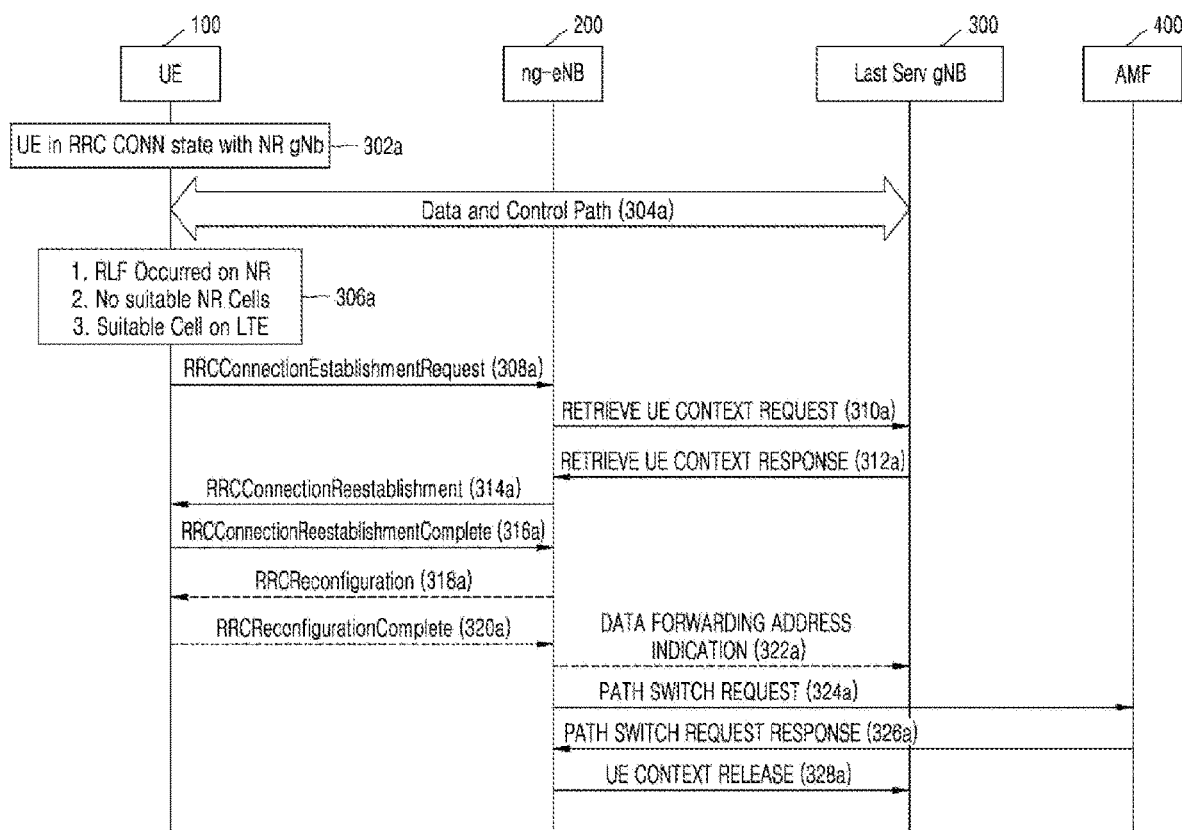
FIG. 3A illustrates a sequence diagram based on UE when IRAT re-establishment is supported between NR/5GC and LTE/5GC (RLF experienced on NR connected to 5GC), according to embodiments of the present disclosure.

FIG. 3A illustrates a sequence diagram based on UE when IRAT re-establishment is supported between NR/5GC and LTE/5GC (RLF experienced on NR connected to 5GC), according to embodiments of the present disclosure.

As shown in the FIG. 3A, at 302*a*, the UE (100) may be in the RRC CONNECT state with the NR gNB (300). At 304*a*, the data and control path may be established between the UE (100) and the last serving gNB (300). At 306*a*, the UE (100) may determine that the RLF occurred on the NR, no suitable on the NR cells, and suitable cell found on the LTE. At 308*a*, the UE (100) may send the RRC connection reestablishment request to the ng-eNB (200). At 310*a*, the ng-eNB (200) may send a retrieve UE context request to the last serving gNB (300). Based on the retrieve UE context request, the last serving gNB (300) may send a retrieve UE context response to the ng-eNB 200 at 312*a*.

At 314*a*, the ng-eNB (200) may send the RRC connection reestablishment to the UE (100). At 316*a*, the UE (100) may send the RRC connection reestablishment complete to the ng-eNB 200. At 318*a*, the ng-eNB (200) may send the RRC reconfiguration to the UE (100). At 320*a*, the UE (100) may send the RRC reconfiguration complete to the ng-eNB (200). At 322*a*, the ng-eNB (200) may send the data forwarding address indication to the last serving gNB (300). At 324*a*, the ng-eNB (200) may send a path switch request to the AMF (400). At 326*a*, the AMF (400) may send a path switch request response to the ng-eNB (200). At 328*a*, the ng-eNB (200) may send the UE context release to the last serving gNB (300).

Figure 3B:
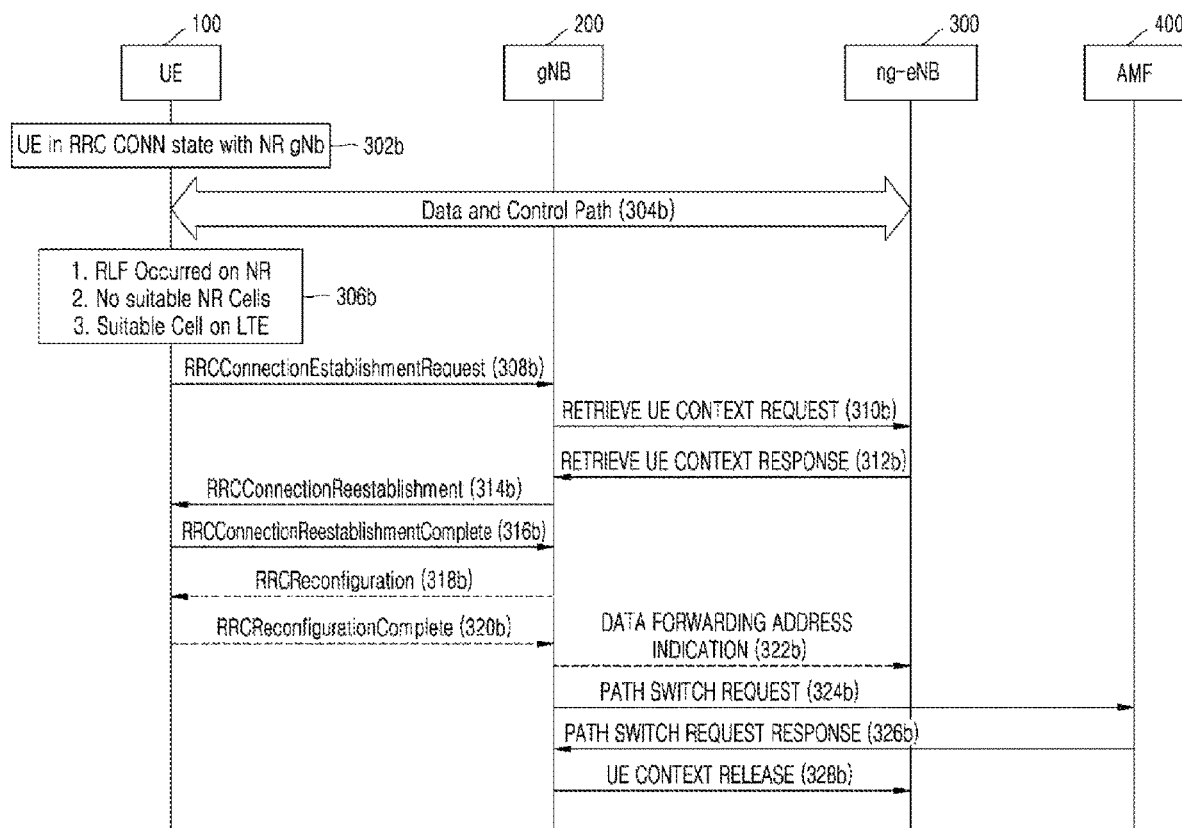
FIG. 3B illustrates a sequence diagram based on the UE when IRAT re-establishment is supported between NR/5GC and LTE/5GC (RLF experienced on LTE connected to 5GC), according to embodiments of the present disclosure.

FIG. 3B illustrates a sequence diagram based on the UE when IRAT re-establishment is supported between NR/5GC and LTE/5GC (RLF experienced on LTE connected to 5GC), according to embodiments of the present disclosure.

As shown in the FIG. 3B, at 302*b*, the UE (100) may be in the RRC CONNECT state with the NR gNb (300). At 304*b*, the data and control path may be established between the UE (100) and the last serv ng-eNB (200). At 306*b*, the UE (100) may determine that the RLF occurred on the NR, no suitable on the NR cells, and suitable cell found on the LTE. At 308*b*, the UE (100) may send the RRC connection reestablishment request to the gNB (300). At 310*b*, the gNB (300) may send a retrieve UE context request to the last serving ng-eNB (200). Based on the retrieve UE context request, the last serving ng-eNB (200) may send a retrieve UE context response to the gNB (300) at 312*a*.

At 314*b*, the gNB (300) may send the RRC connection reestablishment to the UE (100). At 316*b*, the UE (100) may send the RRC connection reestablishment complete to the gNB (300).

At 318*b*, the gNB (300) may send the RRC reconfiguration to the UE (100). At 320*b*, the UE (100) may send the RRC reconfiguration complete to the gNB (300). At 322*b*, the gNB (300) may send the data forwarding address indication to the last serving ng-eNB (200). At 324*b*, the gNB (300) may send a path switch request to the AMF (400). At 326*b*, the AMF (400) may send a path switch request response to the gNB (300). At 328*b*, the gNB (300) may send the UE context release to the last serving ng-eNB (200).

As explained in earlier sections, the UE (100) will send re-establishment message to the new cell and the UE (100) has selected to attempt for RLF recovery if the timer T311 is still running. When the network (i.e., RAN node) receives the RRC re-establishment request message from the UE (100), the RAT may attempt to fetch the UE context from the cell on which the UE (100) declared RLF. The UE (100) may send the re-establishment UE identity along with RRC re-establishment request message to the network. This identity may include the C-RNTI used in the cell on which RLF occurred, the PCI of the cell on which RLF occurred and the shortMAC-I derived based on the security configuration received on the cell on which RLF occurred. The RAN node on which the UE (100) sent re-establishment request to will try to contact the source RAN node or the node on which the UE (100) encountered RLF and attempt to retrieve the UE context.

In a deployment, where the LTE cells connect only to the EPC and NR cells connect only to 5GC, retrieving the UE context and providing radio bearer or Protocol Data Unit (PDU) session continuity may be not straightforward. On the cells connected to the 5GC, data packets may be exchanged or service may be catered using a PDU sessions that may contain several QoS flows multiplexed in them. The PDU sessions may logically connect the UE (100) and the UPF (user plane function), which further connects to data networks. On cells connected to EPS, data packets may be carried over the EPS bearer that is logically connected between the UE (100) and the PDN-GW, which further connects to data networks. Therefore, when the UE (100) attempts to re-establish on the LTE cell after encountering RLF on the NR cell (or vice versa), the PDU sessions need to be translated to EPS bearers in order to continue the session on the LTE RAT. There may be significant change required to core network procedure in order to reconfigure PDU sessions to EPS bearers or vice versa. This is a very complicated, and time and signaling expensive procedure.

Unlike eNB, an eLTE cell belonging to the NG-eNB may be connected to 5GC just like an NR cell is connected to the 5GC. Therefore, the data packets for the UE (100) connected to the NG-eNB cell may be transported over the PDU session as in the NR cells and not over EPS bearers as in traditional LTE cells. As a result, it may be not required to reconfigure the PDU sessions to EPS bearers (or vice versa on moving from LTE to NR during RLF recovery). Therefore, there may be no core network impact in these cases and all the required network interactions may be only over Xn/X2 interface. Therefore, while attempting for RLF recovery from the NR, if the UE (100) selects the suitable LTE cell belonging to NG-eNB that connects to 5GC, the UE (100) may not transit to RRC IDLE state and instead send RRC re-establishment request to the network. In other cases where the UE (100) selects the LTE cell that does not connect to 5GC, UE may transit to RRC IDLE state and initiate RRC connection establishment procedure to establish packet session i.e. RLF recovery fails in this case. The UE behavior on determining the RRC procedure based on that the cell is selected during the RLF recovery is as illustrated in the FIG. 4A and the 4B.

Figure 4A:
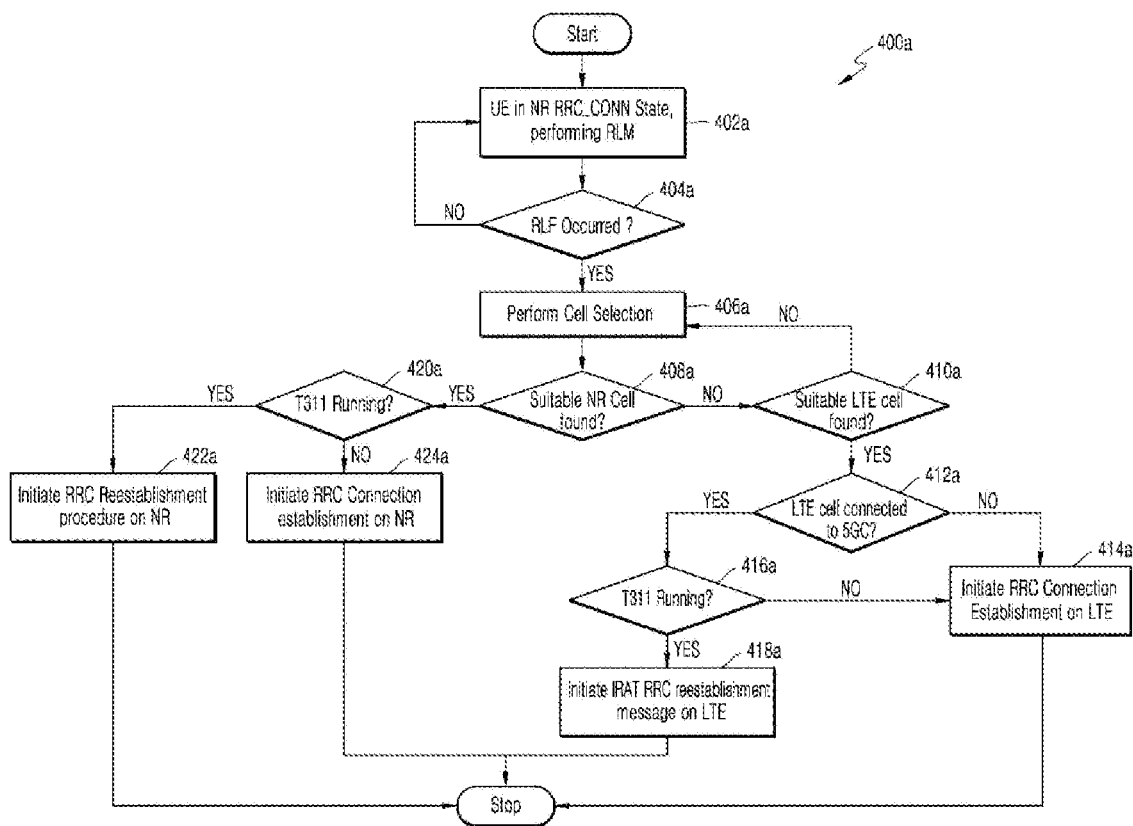
FIG. 4A illustrates a UE procedure on selecting RRC procedure based on the cell selected during RLF recovery and RLF occurred on NR, according to embodiments of the present disclosure.

FIG. 4A illustrates a UE procedure on selecting RRC procedure based on the cell selected during RLF recovery and RLF occurred on NR, according to embodiments of the present disclosure.

As shown in the FIG. 4A, at 402*a*, the UE (100), in a NR RRC CONNECT state, may perform the RLM (radio link monitoring). At 404*a*, the method may include determining whether the RLF is occurred. If the RLF is not occurred then, the method may perform step 402*a*. If the RLF is occurred then, the method may perform the cell selection at 406*a*. At 408*a*, the method may include determining whether the suitable NR cell is found. If the suitable NR cell is not found then, at 410*a*, the method may include determining whether the suitable LTE cell is found. If the suitable LTE cell is not found then, the method may perform step 406*a*. If the suitable LTE cell is found then, at 412*a*, the method may include determining whether the LTE cell is connected to 5GC. If the LTE cell is not connected to the 5GC then, at 414*a*, the method may include initiating a RRC connection establishment on the LTE. If the LTE cell is connected to the 5GC then, at 416*a*, the method may include determining whether the T311 is running. If the T311 is not running then, at 414*a*, the method may include initiating the RRC connection establishment on the LTE. If the T311 is running then, at 418*a*, the method may include initiating the IRAT RRC reestablishment message on the LTE.

If the suitable NR cell is found then, at 420*a*, the method may include determining whether T311 is running. If the T311 is running, at 422*a*, the method may include initiating the RRC Reestablishment procedure on the NR. If the T311 is not running, at 424*a*, the method may include initiating the RRC connection establishment on the NR.

Figure 4B:
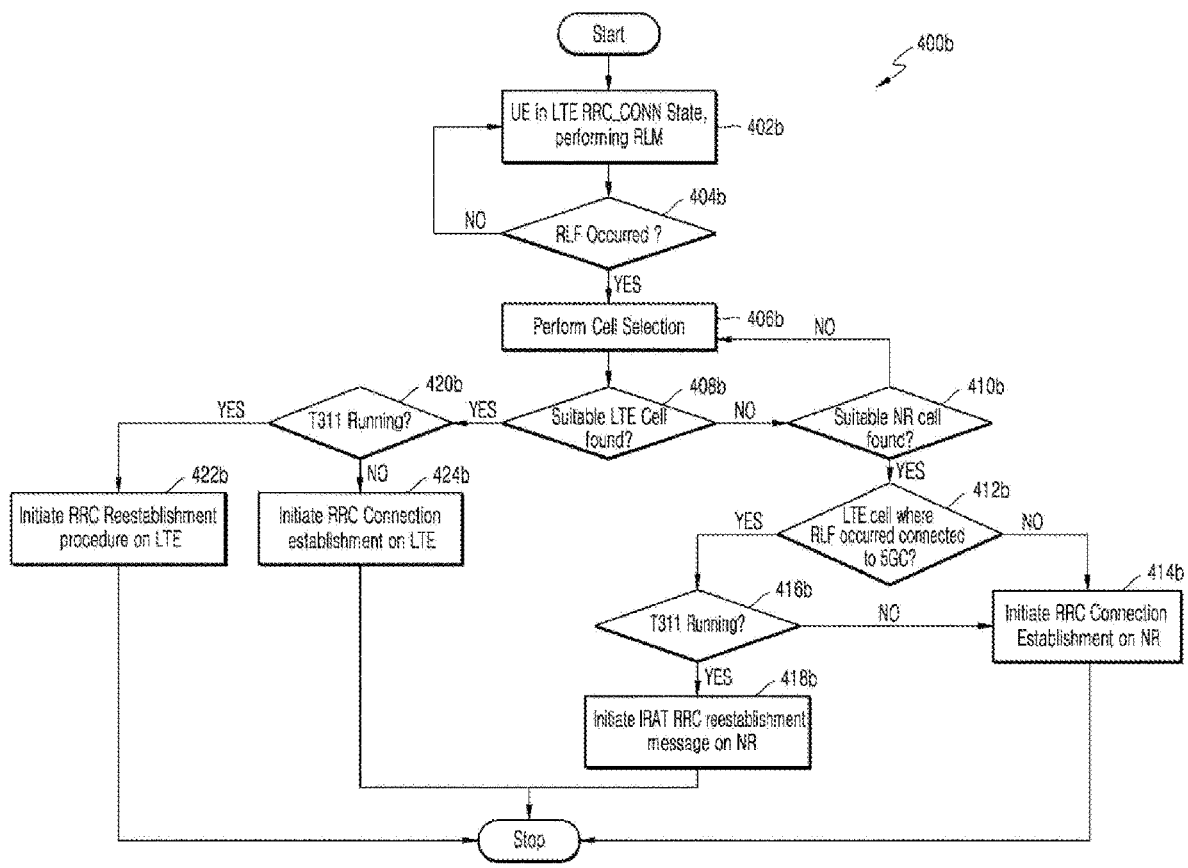
FIG. 4B illustrates a UE procedure on selecting RRC procedure based on the cell selected during RLF recovery and RLF occurred on LTE, according to embodiments of the present disclosure.

FIG. 4B illustrates a UE procedure on selecting RRC procedure based on the cell selected during RLF recovery and RLF occurred on LTE, according to embodiments of the present disclosure.

As shown in the FIG. 4B, at 402*b*, the UE (100), in a LTE RRC CONN state, may perform the RLM. At 404*b*, the method may include determining whether the RLF is occurred. If the RLF is not occurred then, the method may perform step 402*b*. If the RLF is occurred then, the UE may perform the cell selection at 406*b*. At 408*b*, the method may include determining whether the suitable LTE cell is found. If the suitable LTE cell is not found then, at 410*b*, the method may include determining whether the suitable NR cell is found. If the suitable NR cell is not found then, the UE may perform step 406*b*. If the suitable NR cell is found then, at 412*b*, the method may include determining whether the LTE cell where RLF occurred is connected to 5GC. If the LTE cell where RLF is not occurred connected to 5GC then, at 414*b*, the method may include initiating a RRC connection establishment on the NR. If the LTE cell where RLF is occurred connected to 5GC then, at 416*b*, the method may include determining whether the T311 is running. If the T311 is not running then, at 414*b*, the method may include initiating the RRC connection establishment on the NR. If the T311 is running then, at 418*b*, the method may include initiating the IRAT RRC reestablishment message on the NR.

If the suitable LTE cell is found then, at 420*b*, the method may include determining whether T311 is running. If the T311 is running, at 422*b*, the method may include initiating the RRC Reestablishment procedure on the LTE. If the T311 is not running, at 424*b*, the method may include initiating the RRC connection establishment on the LTE.

Method to indicate to the new RAN node about the RAN node on which RLF occurred.

The UE (100) may send the re-establishment UE identity along with RRC re-establishment request message to the network. This identity may include the C-RNTI used in the cell on which the RLF occurred, the PCI of the cell on which RLF occurred and the shortMAC-I derived based on the security configuration received on the cell on which RLF occurred. The RAN node on which the UE (100) sent re-establishment request (e.g., LTE eNB) will attempt to retrieve the UE context from the RAN node on which the UE encountered radio link failure (e.g., NR gNB) based on the re-establishment UE identity that the UE (100) sent in the re-establishment request message. In order to retrieve the UE content that is saved at the source node on which UE encountered radio link failure, the RAN node on which re-establishment is attempted need to identify the source RAN node using PCI, identify the UE context based on C-RNTI and authenticate the UE based on shortMAC-I.

The RAN node (eNB/NG-eNB) which receives the re-establishment message may send RETRIEVE UE CONTEXT message on X2/Xn interface to the cells connected to it that has the PCI same as the PCI in the re-establishment UE identity. However, it is possible that there are multiple cells that have the same PCI as the cell on which radio link failure occurred. In addition, the PCI may be same across cells or RAN nodes belonging to different RATs to which the source cell has X2/Xn connectivity. As per existing 3GPP specifications, RETRIEVE UE CONTEXT may be sent only to RAN nodes that belong to the same RAT type and this limits the network from retrieving UE context from another RAT. Therefore, the network should be able to send RETRIEVE UE CONTEXT message to cells belonging to different RAT as well. One way of retrieving the UE context may be that the new RAN node will send the request to all connected nodes irrespective the RAT Type. However, this could be a costly affair with respect to the signaling amount involved, considering that there could be many RAN nodes to which this new RAN node attempting to retrieve UE context has X2/Xn connectivity to as illustrated in FIG. 5.

Figure 5:
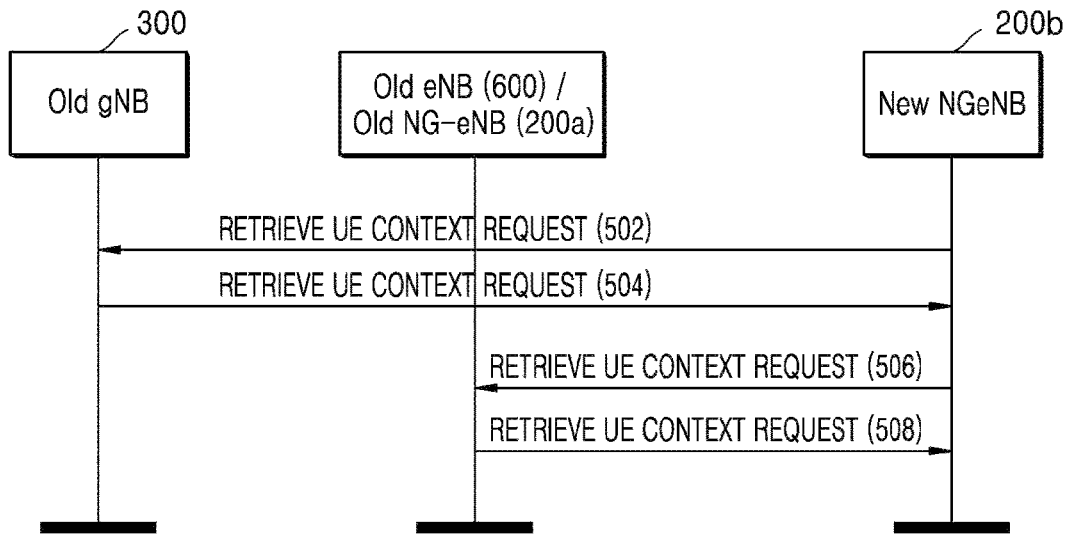
FIG. 5 illustrates that UE context retrieval is attempted on all connected cell on both RATs using the PCI, according to embodiments of the present disclosure.

FIG. 5 illustrates that UE context retrieval is attempted on all connected cell on both RATs using the PCI, according to embodiments of the present disclosure.

As shown in the FIG. 5, at 502, the new NG-eNB (200b) may send the retrieve UE context request to the Old gNB (300). Based on the retrieve UE context request, the old gNB 300 may send the retrieve UE context response to the New NG-eNB 200b at 504. At 506, the new NG-eNB (200b) may send the retrieve UE context request to the old eNB 600/old NG-eNB (200a). Based on the retrieve UE context request, the old eNB 600/old NG-eNB (200a) may send the retrieve UE context response to the New NG-eNB (200b) at 508.

An alternative method may be to indicate to the network about the RAT type on which the radio link failure has occurred. In such cases, the network node receiving the re-establishment message may attempt to retrieve the UE context from cells having the same PCI and belongs to the same RAT type. As an example, if RLF occurred on LTE eNB1/NG-eNB1 and re-establishment is sent to LTE eNB2/NG-eNB2, the UE (100) will indicate that the RAT type on which the radio link failure occurred is the LTE. Therefore, the eNB2/NG-eNB2 will attempt to retrieve context only from connected LTE eNB/cell to which X2 connectivity is available. Similarly, if RLF occurred on the NR gNB1 and re-establishment is sent to the LTE eNB2/NG-eNB2, the UE (100) will indicate that the RAT type on which the radio link failure occurred as NR. Therefore, the eNB2/NG-eNB2 will attempt to retrieve context only from connected NR gNB/cell to which X2/Xn connectivity is available. This may be added to RRC messages in one of the following two ways:

I. Add it at an additional IE in the existing RRC re-establishment message, and

II. Add as a new RRC re-establishment message rrcConnectionReestablishmentRequest1 or rrcReestablishmentRequest1. In this case, new message for UL-CCCH also has to be defined.

TABLE 1

LTE re-establishment message ALT 1 - Extending existing RRC message with 1 bit RAT-Type indicator

```
-- ASN1START
RRCConnectionReestablishmentRequest ::= SEQUENCE {
    criticalExtensions              CHOICE {
    rrcConnectionReestablishmentRequest-r8
                        RRCConnectionReestablishmentRequest-r8-IEs,
        criticalExtensionsFuture    SEQUENCE { }
    }
}
RRCConnectionReestablishmentRequest-r8-IEs ::= SEQUENCE {
    ue-Identity                 ReestabUE-Identity,
    reestablishmentCause        ReestablishmentCause,
    spare                       BIT STRING (SIZE (2))
    reestablishmentRATType      ENUMERATED {LTE, NR}
}
ReestabUE-Id entity ::=         SEQUENCE {
    c-RNTI                          C-RNTI,
    physCellId                      PhysCellId,
    shortMAC-I                      ShortMAC-I
}
ReestablishmentCause ::=        ENUMERATED {
                                reconfigurationFailure, handoverFailure,
                                otherFailure, spare1
}
-- ASN1STOP
```

TABLE 2

LTE re-establishment message ALT 2 - Create new RRC message with RAT type indicator as part of Re-establishment UE-ID. New message on UL-CCCH is introduced.

```
-- ASN1START
RRCConnectionReestablishmentRequest ::= SEQUENCE {
    criticalExtensions              CHOICE {
    rrcConnectionReestablishmentRequest1-r8
                        RRCConnectionReestablishmentRequest1-r8-IEs,
        criticalExtensionsFuture    SEQUENCE { }
    }
}
RRCConnectionReestablishmentRequest1-r8-IEs ::= SEQUENCE {
    ue-Identity                 ReestabUE-Identity,
    reestablishmentCause        ReestablishmentCause,
    spare                       BIT STRING (SIZE (2))
}
ReestabUE-Id entity ::=         SEQUENCE {
```

TABLE 2-continued

LTE re-establishment message ALT 2 - Create new RRC message
with RAT type indicator as part of Re-establishment UE-ID.
New message on UL-CCCH is introduced.

```
    c-RNTI                              C-RNTI,
    physCellId                          PhysCellId,
    shortMAC-I                            ShortMAC-I
    reestablishmentRATType                ENUMERATED {LTE, NR)
}
ReestablishmentCause ::=                ENUMERATED {
                                          reconfigurationFailure, handoverFailure,
                                          otherFailure, spare1

}
-- ASN1STOP
-- ASN1START
UL-CCCH-Message ::= SEQUENCE {
    message                             UL-CCCH-MessageType
}
UL-CCCH-MessageType ::= CHOICE {
    c1                      CHOICE {
      rrcConnectionReestablishmentRequest          RRCConnectionReestablishmentRequest,
      rrcConnectionRequest                         RRCConnectionRequest
    },
    messageClassExtensionCHOICE {
      c2                                CHOICE {
        rrcConnectionResumeRequest-r13             RRCConnectionResumeRequest-r13
      },
      messageClassExtensionFuture-r13       CHOICE {
        c3                              CHOICE {
          rrcEarlyDataRequest-r15                  RRCEarlyDataRequest-r15,
                      spare3 NULL, spare2  NULL, spare1 NULL
        },
        messageClassExtensionFuture-r15     CHOICE {
          c4                            CHOICE {
            rrcConnectionReestablishmentRequest1-r16
RRCConnectionReestablishmentRequest1,
            spare2 NULL, spare1 NULL
          }
          messageClassExtensionFuture-r16             SEQUENCE { }
        }
      }
    }
}
-- ASN1STOP
```

TABLE 3

NR re-establishment message ALT 1 - Extending existing RRC
message with 1 bit RAT-Type indicator

```
-- ASN1START
-- TAG-RRCREESTABLISHMENTREQUEST-START
RRCReestablishmentRequest ::= SEQUENCE {
  rrcReestablishmentRequest RRCReestablishmentRequest-IEs
}
RRCReestablishmentRequest-IEs ::= SEQUENCE {
  ue-Identity ReestabUE-Identity,
  reestablishmentCause ReestablishmentCause,
  spare BIT STRING (SIZE (1))
  reestablishmentRATType ENUMERATED {LTE, NR}
  spare BIT STRING (SIZE (7))
}
ReestabUE-Identity ::= SEQUENCE {
  c-RNTI RNTI-Value,
  physCellId PhysCellId,
  shortMAC-I ShortMAC-I
}
ReestablishmentCause ::= ENUMERATED {reconfigurationFailure, handoverFailure,
otherFailure, spare1}
-- TAG-RRCREESTABLISHMENTREQUEST-STOP
-- ASN1STOP
```

TABLE 4

NR re-establishment message ALT 2 - Create new RRC message with
RAT type indicator as part of Re-establishment UE-ID. New message on UL-CCCH is introduced.

```
-- ASN1START
-- TAGRRCREESTABLISHMENTREQUEST-START
RRCReestablishmentRequest1 ::= SEQUENCE {
  rrcReestablishmentRequest1 RRCReestablishmentRequest1-IEs
}
RRCReestablishmentRequest1-IEs ::= SEQUENCE {
  ue-Identity ReestabUE-Identity,
  reestablishmentCause ReestablishmentCause,
  spare BIT STRING (SIZE (7))
}
ReestabUE-Identity ::= SEQUENCE {
  c-RNTI RNTI-Value,
  physCellId PhysCellId,
  shortMAC-I ShortMAC-I
    reestablishmentRATType ENUMERATED {LTE, NR}
ReestablishmentCause ::= ENUMERATED {reconfigurationFailure, handoverFailure,
otherFailure, spare1}
-- TAG-RRCREESTABLISHMENTREQUEST-STOP
-- ASN1STOP
UL-CCCH1-Message ::= SEQUENCE {
  message UL-CCCH1-MessageType
}
UL-CCCH1-MessageType ::= CHOICE {
  c1 CHOICE {
  rrcResumeRequest1 RRCResumeRequest1,
  rrcReestablishmentRequest1, RRCReestablishmentRequest1
  spare2 NULL,
  spare1 NULL
  },
  messageClassExtension SEQUENCE { }
}
```

In this method, it can be observed that the UE (100) may always send a RAT type to the network irrespective of where the radio link failure occurred. An alternative method may be to indicate as identifier to the network node only when the RLF recovery is being attempted on a different RAT that the one on which RLF occurred. In such cases, an inter-RAT indication may be sent in the RRC re-establishment message indicating the IRAT RLF recovery that is required. If the field is present, the UE context retrieval may be attempted only from cells that belong to the other RAT, if this field is absent, the UE context retrieval may be attempted only from cell that belong to the same RAT. This may be added to RRC messages in one of the following two ways:

1. Add it at an additional IE in the existing RRC re-establishment message.
2. Add as a new RRC re-establishment message rrcConnectionReestablishmentRequest1 or rrcReestablishmentRequest1. In this case, new message for UL-CCCH also has to be defined.

TABLE 5

LTE re-establishment message ALT 1 - Extending existing RRC
message with 1 bit RAT-Type indicator

```
-- ASN1START
RRCConnectionReestablishmentRequest ::= SEQUENCE {
    criticalExtensions           CHOICE {
        rrcConnectionReestablishmentRequest-r8
                                     RRCConnectionReestablishmentRequest-r8-IEs,
        criticalExtensionsFuture    SEQUENCE { }
    }
}
RRCConnectionReestablishmentRequest-r8-IEs ::= SEQUENCE {
    ue-Identity              ReestabUE-Identity,
    reestablishmentCause     ReestablishmentCause,
    spare                    BIT STRING (SIZE (2))
    reestablishmentInterRAT  ENUMERATED {TRUE} OPTIONAL
    spare                    BIT STRING (SIZE (1))
}
ReestabUE-Identity ::=   SEQUENCE {
    c-RNTI                   C-RNTI,
    physCellId               PhysCellId,
    shorMAC-I                ShortMAC-I
}
ReestablishmentCause ::=  ENUMERATED {
                              reconfigurationFailure, handoverFailure,
                              otherFailure, spare 1
```

TABLE 5-continued

LTE re-establishment message ALT 1 - Extending existing RRC message with 1 bit RAT-Type indicator

```
}
-- ASN1STOP
```

TABLE 6

LTE re-establishment message ALT 2 - Create new RRC message with RAT type indicator as part of Re-establishment UE-ID. New message on UL-CCCH is introduced

```
-- ASN1START
RRCConnectionReestablishmentRequest ::= SEQUENCE {
    criticalExtensions                    CHOICE {
        rrcConnectionReestablishmentRequest1-r8
                                          RRCConnectionReestablishmentRequest1-r8-IEs,
        criticalExtensionsFuture          SEQUENCE { }
    }
}
RRCConnectionReestablishmentRequest1-r8-IEs ::= SEQUENCE {
    ue-Identity                           ReestabUE-Identity,
    reestablishmentCause                  ReestablishmentCause,
    spare                                 BIT STRING (SIZE (1))
}
ReestabUE-Identity ::=                    SEQUENCE {
    c-RNTI                                C-RNTI,
    physCellId                            PhysCellId,
    shortMAC-I                            ShortMAC-I
    reestablishmentInterRAT                   ENUMERATED {TRUE}
OPTIONAL
}
ReestablishmentCause ::=                  ENUMERATED {
                                          reconfigurationFailure, handoverFailure,
                                          otherFailure, spare1
}
-- ASN1STOP
-- ASN1START
UL-CCCH-Message ::= SEQUENCE {
    message                               UL-CCCH-MessageType
}
UL-CCCH-MessageType ::= CHOICE {
    c1                                    CHOICE {
        rrcConnectionReestablishmentRequest       RRCConnectionReestablishmentRequest,
        rrcConnectionRequest                      RRCConnectionRequest
    },
    messageClassExtensionCHOICE {
        c2                                CHOICE {
            rrcConnectionResumeRequest-r13        RRCConnectionResumeRequest-r13
        },
        messageClassExtensionFuture-r13       CHOICE {
            c3                            CHOICE {
                rrcEarlyDataRequest-r15           RRCEarlyDataRequest-r15,
                                    spare3 NULL, spare2 NULL, spare1 NULL
            },
            messageClassExtensionFuture-r15       CHOICE {
                c44                       CHOICE {
                    rrcConnectionReestablishmentRequest1-r16
RRCConnectionReestablishmentRequest1,
                    spare2 NULL, spare1           NULL
                }
                messageClassExtensionFuture-r16       SEQUENCE { }
            }
        }
    }
}
-- ASN1STOP
```

TABLE 7

NR re-establishment message ALT 1 - Extending existing RRC message with 1 bit RAT-Type indicator

```
-- ASN1START
-- TAG-RRCREESTABLISHMENTREQUEST-START
RRCReestablishmentRequest ::= SEQUENCE {
```

TABLE 7-continued

NR re-establishment message ALT 1 - Extending existing RRC message with 1 bit RAT-Type indicator

```
  rrcReestablishmentRequest RRCReestablishmentRequest-IEs
}
RRCReestablishmentRequest-IEs ::= SEQUENCE {
  ue-Identity ReestabUE-Identity,
  reestablishmentCause ReestablishmentCause,
  spare BIT STRING (SIZE (1))
    reestablishmentInterRAT ENUMERATED {TRUE}
}
ReestabUE-Identity ::= SEQUENCE {
  c-RNTI RNTI-Value,
  physCellId PhysCellId,
  shortMAC-I ShortMAC-I
}
ReestablishmentCause ::= ENUMERATED {reconfigurationFailure, handoverFailure,
otherFailure, spare1}
-- TAG-RRCREESTABLISHMENTREQUEST-STOP
-- ASN1STOP
```

(Note: "spare BIT STRING (SIZE (1))" is shown with strikethrough.)

TABLE 8

NR re-establishment message ALT 2 - Create new RRC message with RAT type indicator as part of Re-establishment UE-ID. New message on UL-CCCH is introduced.

```
-- ASN1START
-- TAG-RRCREESTABLISHMENTREQUEST-START
RRCReestablishmentRequest1 ::= SEQUENCE {
  rrcReestablishmentRequest1 RRCReestablishmentRequest1-IEs
}
RRCReestablishmentRequest1-IEs ::= SEQUENCE {
  ue-Identity ReestabUE-Identity,
  reestablishmentCause ReestablishmentCause,
}
ReestabUE-Identity ::= SEQUENCE {
  c-RNTI RNTI-Value,
  physCellId PhysCellId,
  shortMAC-I ShortMAC-I
    reestablishmentInterRAT ENUMERATED {TRUE}
}
ReestablishmentCause ::= ENUMERATED {reconfigurationFailure, handoverFailure,
otherFailure, spare1}
-- TAG-RRCREESTABLISHMENTREQUEST-STOP
-- ASN1STOP
UL-CCCH1-Message ::= SEQUENCE {
  message UL-CCCH1-MessageType
}
UL-CCCH1-MessageType ::= CHOICE {
  c1 CHOICE {
  rrcResumeRequest1 RRCResumeRequest1,
  rrcReestablishmentRequest1, RRCReestablishmentRequest1
  spare2 NULL,
  spare1 NULL
  },
  messageClassExtension SEQUENCE { }
}
```

Method to Continue RLF Timers on Other RAT:

As provisioned in current 3GPP specifications, when the RLF is declared on the UE (100), timer T311 may be started with the value configured by the network. RLF recovery may be attempted only till T311 is running and expiry of T311 leads to RLF recovery failure. When cell selection for the purpose of RLF recovery is attempted on another RAT (e.g., LTE) than the RAT on which RLF occurred (e.g., NR) while T311 is running, the UE may transit to the RRC IDLE state and stop T311. RLF recovery failure may be declared at this point.

In order to allow for inter-RAT re-establishment procedure, the UE (100) should not transition to RRC IDLE state on performing cell selection on the other RAT. Instead, timer T311 value remaining on the source RAT shall be transferred to the new RAT. Now, the T311 will run for the remaining time (as configured by the source RAT/cell on which RLF occurred) on the new RAT. If a suitable cell is selected that connects to the 5GC, the UE (100) may initiate RRC connection reestablishment procedure as illustrated below:

| Timer | Start | Stop | At expiry |
|---|---|---|---|
| T300 | Upon transmission of RRCSetupRequest. | Upon reception of RRCSetup or RRCReject message, cell re-selection and upon abortion of connection establishment by upper layers. | Perform the actions as specified in 5.3.3.7. |
| T301 | Upon transmission of RRCReestabilshmentRequest | Upon reception of RRCReestablishment or RRCSetupmessage as well as when the selected cell becomes unsuitable | Go to RRC_IDLE |
| T302 | Upon reception of RRCReject while performing RRC connection establishment or resume, upon reception of RRCRelease with waitTime. | Upon entering RRC_CONNECTED, upon cell re-selection and upon reception of RRCReject message. | Inform upper layers about barring alleviation as specified in 5.3.14.4 |
| T304 | Upon reception of RRCReconfiguration message including reconfigurationWithSync | Upon successful completion of random access on the corresponding SpCell For T304 of SCG, upon SCG release | For T304 of MCG, in case of the handover from NR or intra-NR handover, initiate the RRC re-establishment procedure; In case of handover to NR, perform the actions defined in the specifications applicable for the source RAT. For T304 of SCG, inform network about the reconfiguration with sync failure by initiating the SCG failure information procedure as specified in 5.7.3. |
| T310 | Upon detecting physical layer problems for the SpCell i.e. upon receiving N310 consecutive out-of-sync indications from lower layers. | Upon receiving N311 consecutive in-sync indications from lower layers for the SpCell, upon receiving RRCReconfiguration with reconfigurationWithSync for that cell group, and upon initiating the connection re-establishment procedure. Upon SCG release, if the T310 is kept in SCG. | If the T310 is kept in MCG: If security is not activated: go to RRC_IDLE else: initiate the connection re-establishment procedure. If the T310 is kept in SCG, Inform E-UTRAN/NR about the SCG radio link failure by initiating the SCG failure information procedure as specified in 5.7.3. |
| T311 | Upon initiating the RRC connection re-establishment procedure or upon cell selection to NR from EUTRA when T311 is running on EUTRA (in which case the remaining time is applied). | Upon selection of a suitable NR cell or a cell using another RAT and upon cell selection to EUTRA (in which case the remaining time is applied on EUTRA). | Enter RRC_IDLE |

5.2.3  Cell Selection process (3GPP TS 36.304)
...
The UE shall inherit the remaining time of T311 from NR, if EUTRA cell selection is performed while T311 was running in NR as described in 38.331[37].
5.2.3  Cell Selection process (3GPP TS 38.304)
The UE shall inherit the remaining time of T311 from EUTRA, if NR cell selection is performed while T311 was running in EUTRA as described in 36.331[6].
 5.3.11 UE actions upon going to RRC_IDLE (3GPP TS 38.331)
UE shall:
1> reset MAC;
1> if T302 is running:`
  2> stop timer T302;
  2> perform the actions as specified in 5.3.14.4;
1> stop all timers that are running except T320 and T325;
1> discard the UE Inactive AS context;
1> set the variable pendingRnaUpdate to false, if that is set to true;
1> discard the $K_{gNB}$, the $K_{RRCenc}$ key, the $K_{RRCint}$, the $K_{UPint}$ key and the $K_{UPenc}$ key, if any;
1> release all radio resources, including release of the RLC entity, the MAC configuration and the associated PDCP entity and SDAP for all established RBs;

1> indicate the release of the RRC connection to upper layers together with the release cause;
1> if going to RRC_IDLE was triggered by selecting an inter-RAT cell while T311 was running;
    2> if cell selection is performed on EUTRA cell connected to 5GC, continue the remaing time of timer T311 on EUTRA as described in 36.304 [27]
1> else
    2> enter RRC_IDLE and perform cell selection as specified in TS 38.304 [20],
1> if going to RRC_IDLE was triggered by reception of the RRCRelease message including a waitTime:
    2> start timer T302 with the value set to the waitTime;
    2> inform the upper layer that access barring is applicable for all access categories except categories '0' and '2'.
5.3.12   UE actions upon leaving RRC_CONNECTED or RRC_INACTIVE
Upon leaving RRC_CONNECTED or RRC_INACTIVE, the UE shall:
1> reset MAC;
1> if the UE is leaving RRC_INACTIVE:
    2> stop the timer T320, if running;
    2> if stored, discard the cell reselection priority information provided by the idleModeMobilityControlInfo;1>   if T302 is running and if the UE is connected to 5GC:
    2> stop timer T302;
    2> perform the actions as specified in 5.3.16.4;
1> stop all timers that are running except T320, T322, T325, T330;
1> if leaving RRC_CONNECTED was triggered by suspension of the RRC:
    2> re-establish RLC entities for all SRBs and DRBs, including RBs configured with NR PDCP;
    2> store the UE AS Context including the current RRC configuration, the current security context, the PDCP state including ROHC state, C-RNTI used in the source PCell, the cellIdentity and the physical cell identity of the source PCell;
    2> store the following information provided by E-UTRAN:
        3> the resumeIdentity;
        3> the nextHopChainingCount, if present. Otherwise discard any stored nextHopChainingCount that does not correspond to stored key $K_{RRCint}$;
        3> the drb-ContinueROHC, if present. Otherwise discard any stored drb-ContinueROHC;
    2> suspend all SRB(s) and DRB(s), including RBs configured with NR PDCP, except SRB0;
    2> indicate the suspension of the RRC connection to upper layers;
    2> configure lower layers to suspend integrity protection and ciphering;
NOTE 1:   Except for UP-EDT, ciphering is not applied for the subsequent RRCConnectionResume message used to resume the connection and an integrity check is performed by lower layers, but merely upon request from RRC.
1> else:
    2> upon leaving RRC_INACTIVE:
        3> discard the UE Inactive AS context;
        3> discard the $K_{eNB}$, the $K_{RRCenc}$ key, the $K_{RRCint}$ and the $K_{UPenc}$ key;
    2> release all radio resources, including release of the MAC configuration, the RLC entity and the associated PDCP entity and SDAP (if any) for all established RBs;
    2> indicate the release of the RRC connection to upper layers together with the release cause;
1> if leaving RRC_CONNECTED was triggered neither by reception of the MobilityFromEUTRACommand message nor by selecting an inter-RAT cell while T311 was running:
    2> if timer T350 is configured:
        3> start timer T350;
        3> apply rclwi-Configuration if configured, otherwise apply the wlan-Id-List corresponding to the RPLMN included in SystemInformationBlockType17;
    2> else:
        3> release the wlan-OffloadConfigDedicated, if received;
        3> if the wlan-OffloadConfigCommon corresponding to the RPLMN is broadcast by the cell:
            4> apply the wlan-OffloadConfigCommon corresponding to the RPLMN included in SystemInformationBlockType17;
            4> apply steerToWLAN if configured, otherwise apply the wlan-Id-List corresponding to the RPLMN included in SystemInformationBlockType17;
    2> enter RRC_IDLE and perform procedures as specified in TS 36.304 [4], clause 5.2.7;
1> if leaving RRC_CONNECTED was triggered by selecting an inter-RAT cell while T311 was running:
    2> if EUTRA cell where radio link failure was detected was connected to 5GC and cell selection is performed on NR cell, continue the remaining time of timer T311 on EUTRA as described in 38.304 [92]
1> else:
    2> release the wlan-OffloadConfigDedicated, if received;
NOTE 2:   BL UEs or UEs in CE verifies validity of SI when released to RRC_IDLE.
1> release the LWA configuration, if configured, as described in 5.6.14.3;
1> release the LWIP configuration, if configured, as described in 5.6.17.3;

If the UE (100) selects a suitable IRAT cell while T311 is running on new RAT for remainder of the duration, but does not connect to 5GC, the UE (100) may declare the RLF recovery failure and transit to RRC IDLE state thereby stopping T311 timer. If timer T311 expires and the UE (100) fails to select any suitable cell on the new RAT, RLF recovery failure may be declared and the UE transitions to RRC IDLE state.

Method to Prioritize Cell Selection Procedure:

When the RLF occurs on the NR RAT and the UE (100) attempts RLF recovery on LTE RAT, the UE (100) may perform cell selection on the LTE RAT. However, the current provisions in 3GPP specifications may not prioritize cell selection based on the core network that the cell is connected to. This may raise the possibility of premature declaration of inter-RAT RLF recovery if the UE (100) selects a cell that does not connect to 5GC, in an area where cells connected to 5GC are also available. Therefore, it may be required for the UE to prioritize selection of cells that connect to 5GC while performing IRAT RLF recovery and T311 is running as illustrated in the FIG. 6.

Figure 6:
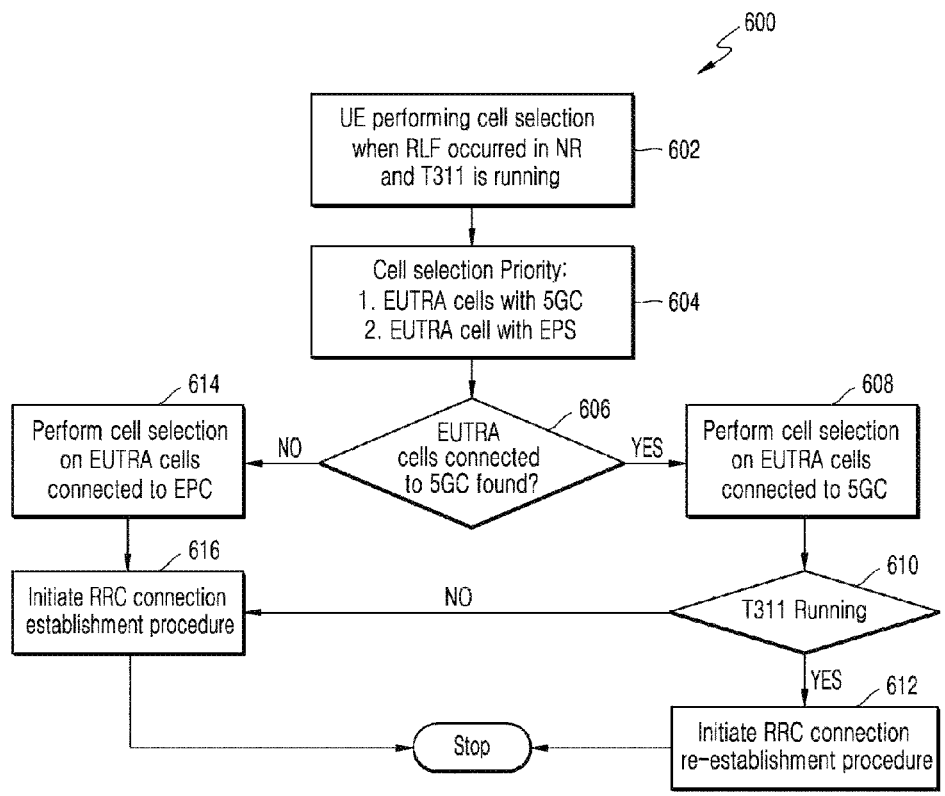
FIG. 6 illustrates priority of EUTRA cell selection following RLF on NR and T311 is running, according to embodiments of the present disclosure.

FIG. 6 illustrates priority of EUTRA cell selection following RLF on NR and T311 is running, according to embodiments of the present disclosure.

As shown in the FIG. 6, at 602, the UE (100) may perform a cell selection when the RLF occurred in NR and T311 is running. At 604, the method may include performing the cell selection with priority (1. EUTRA cells with 5GC and 2. EUTRA cell with EPS). At 606, the method may include determining whether the EUTRA cells is connected to 5GC found. If the EUTRA cells are connected to 5GC found then, at 608, the method may include performing the cell selection on the EUTRA cells connected to 5GC. At 610, the method may include determining whether the T311 is running. If the T311 is running then, at 612, the method may include initiating the RRC connection re-establishment procedure. If the EUTRA cells are not connected to 5GC found then, at 614, the method may include performing the cell selection on the EUTRA cells connected to EPC. The method may include initiating the RRC connection establishment procedure at 616. If the T311 is running then, at 616, the method may include performing step 616.

Method to Perform Inter-RAT Resume:

In current specification, the UE (100), when sent to INACTIVE state on the LTE cell, can resume only LTE cell i.e. if INACTIVE UE re-selects NR cell then the UE (100) goes to IDLE state and performs connection establishment on NR cell. Likewise, the UE (100) when sent to INACTIVE state on NR cell can resume only NR cell i.e. if INACTIVE UE re-selects LTE cell then UE goes to IDLE state and performs connection establishment on LTE cell. This is depicted in FIG. 7A and FIG. 7A.

Figure 7A:
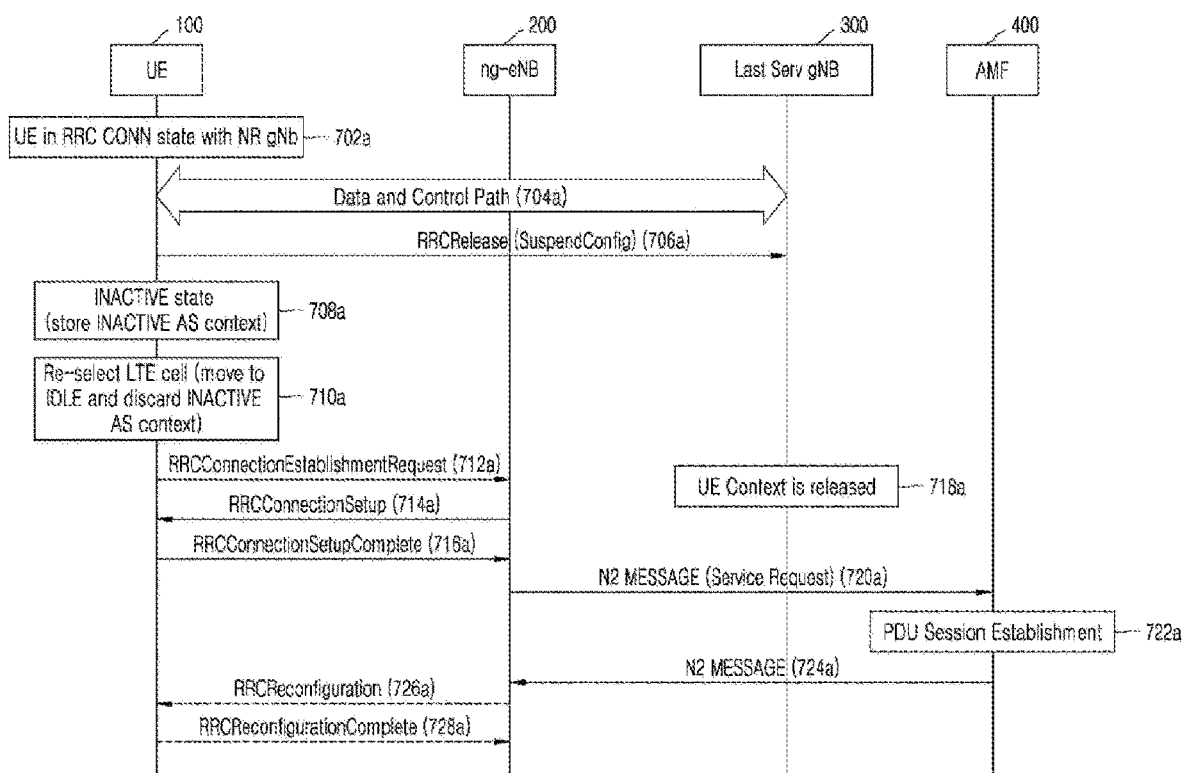
FIG. 7A illustrates a message sequence based on current specification where IRAT resume is not supported (UE sent to INACTIVE by NR cell and UE reselects LTE cell in INACTIVE state) according to embodiments of the present disclosure.
Figure 7B:
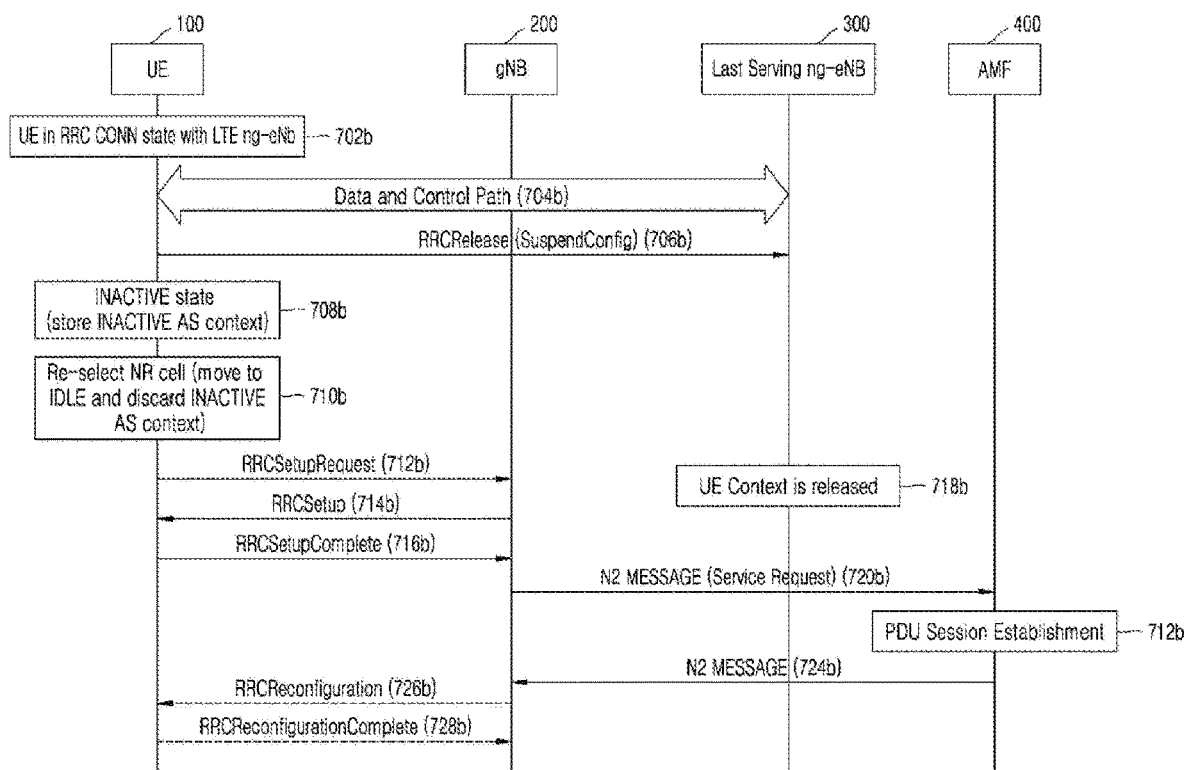
FIG. 7B illustrates a message sequence based on current specification where IRAT resume is not supported (UE sent to INACTIVE by LTE cell and UE reselects NR cell in INACTIVE state) according to embodiments of the present disclosure.

FIG. 7A illustrates a message sequence based on current specification where IRAT resume is not supported (UE sent to INACTIVE by NR cell and UE reselects LTE cell in INACTIVE state) according to embodiments of the present disclosure.

As shown in the FIG. 7A, at 702*a*, the UE (100) may be in the RRC CONN state with NR gNb. At 704*a*, the data and control path may be established between the UE (100) and the last serving gNB (300). The last serving gNB (300) may send the RRC Release (SuspendConfig) to the UE (100) at 706*a*. At 708*a*, the UE (100) may determine that inactive state (i.e., store INACTIVE AS context). At 710*a*, the UE (100) may re-select the LTE cell (move to IDLE and discard INACTIVE AS context).

At 712*a*, the UE (100) may send the RRC connection establishment request to the ng-eNB 200. At 714*a*, the ng-eNB (200) may send the RRC connection setup to the UE (100). At 716*a*, the UE (100) may send the RRC connection setup complete to the ng-eNB 200. At 718*a*, the UE context may be released at the last serv gNB (300). At 720*a*, the ng-eNB 200 may send the N2 message (service request) to the AMF (400). At 722*a*, the PDU session establishment may be occurred at the AMF (400). At 724*a*, the AMF (400) may send the N2 message to the ng-eNB (200). Based on the N2 message, at 726*a*, the ng-eNB (200) may send a RRC reconfiguration to the UE (100). At 728*a*, the UE (100) may send the RRC reconfiguration complete to the ng-eNB (200).

FIG. 7A illustrates a message sequence based on current specification where IRAT resume is not supported (UE sent to INACTIVE by LTE cell and UE reselects NR cell in INACTIVE state) according to embodiments of the present disclosure.

As shown in the FIG. 7A, at 702*b*, the UE (100) may be in the RRC CONN state with the NR gNb. At 704*b*, the data and control path may be established between the UE (100) and the last serving ng-eNB (200). The last serving ng-eNB (200) may send the RRC Release (SuspendConfig) to the UE (100) at 706*b*. At 708*b*, the UE (100) may determine that the inactive state (i.e., store INACTIVE AS context). At 710*b*, the UE (100) may re-select the NR cell (move to IDLE and discard INACTIVE AS context).

At 712*b*, the UE (100) may send the RRC setup request to the gNB (300). At 714*b*, the gNB (300) may send the RRC setup to the UE (100). At 716*b*, the UE (100) may send the RRC setup complete to the gNB (300). At 718*b*, the UE context may be released at the last Serving ng-eNB (200). At 720*b*, the gNB (300) may send the N2 message (service request) to the AMF (400). At 722*b*, the PDU session establishment may be occurred at the AMF (400). At 724*b*, the AMF (400) may send the N2 message to the gNB (300). Based on the N2 message, at 726*b*, the gNB (300) may send a RRC reconfiguration to the UE. At 728*a*, the UE (100) may send the RRC reconfiguration complete to the gNB (300).

For legacy LTE deployments where the eNB connects only to EPC core network, retrieving the UE context and providing radio bearer or PDU session continuity may be not straightforward. On cells connected to the 5GC, data packets may be exchanged or service may be catered using the PDU sessions that may contain several QoS flows multiplexed in them. The PDU sessions may logically connect the UE and the UPF, which further connects to data networks. On cells connected to EPS, data packets may be carried over an EPS bearer that is logically connected between the UE (100) and PDN-GW, which further connects to data networks. Therefore, when the UE (100) attempts to resume on the LTE cell after encountering RLF on the NR cell (or vice versa), the PDU sessions need to be translated to the EPS bearers in order to continue the session on the LTE RAT (or vice versa). There is significant change required to core network procedure in order to reconfigure PDU sessions to EPS bearers or vice versa. This is a very complicated, and time and signaling expensive procedure.

Unlike eNB, the eLTE cell belonging to NG-eNB may be connected to 5GC just like an NR cell is connected to the 5GC. Therefore, the data packets for the UE connected to the NG-eNB cell may be transported over the PDU session as in the NR cells and not over EPS bearers as in traditional LTE cells. As a result, it is not required to reconfigure the PDU sessions to EPS bearers (or vice versa on moving from LTE to NR during RLF recovery). Therefore, there may be no core network impact in these cases and all the required network interactions may be only over Xn/X2 interface. Therefore, while attempting for resuming a connection which was moved to INACTIVE state from NR, if the UE (100) selects a suitable LTE cell belonging to NG-eNB that connects to 5GC, the UE (100) may remain in RRC INACTIVE state and send the RRC resume request to the network. In other cases where the UE (100) selects the LTE cell that does not connect to the 5GC, the UE (100) may transit to the RRC IDLE state and initiate the RRC connection establishment procedure to establish packet session i.e. RLF recovery fails in this case.

Therefore, the resume procedure can be enhanced across RAT connected to the 5GC. The UE (100) may support an INACTIVE state and capable of supporting LTE/5GC and NR/5GC can perform resume procedure on the LTE cell or the NR cell during cell reselection in the INACTIVE state. The UE (100), sent to INACTIVE state on LTE cell if the INACTIVE UE re-selects NR cell then the UE (100) does not go to IDLE state, may not discard INACTIVE AS context and performs resume procedure on the NR cell. Likewise, the UE (100), when sent to INACTIVE state on NR cell if the INACTIVE UE re-selects LTE cell then UE does not go to IDLE state, may not discard INACTIVE AS context and performs resume procedure on LTE cell. This is depicted in FIG. 8A and FIG. 8B.

Figure 8A:
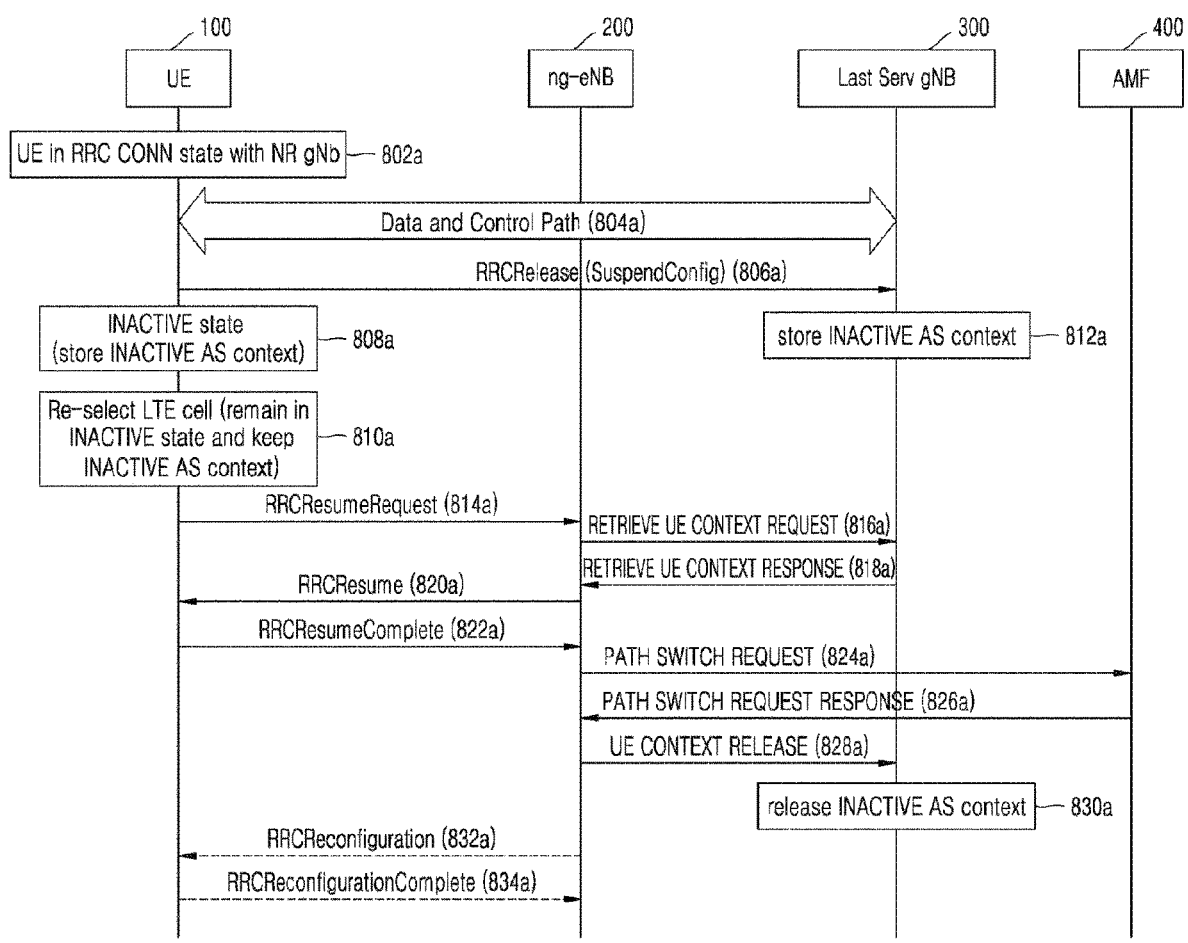
FIG. 8A illustrates a message sequence based on a UE when IRAT resume is supported between NR/5GC and LTE/5GC (UE sent to INACTIVE by NR cell and UE reselects LTE cell in INACTIVE state, according to embodiments of the present disclosure.
Figure 8B:
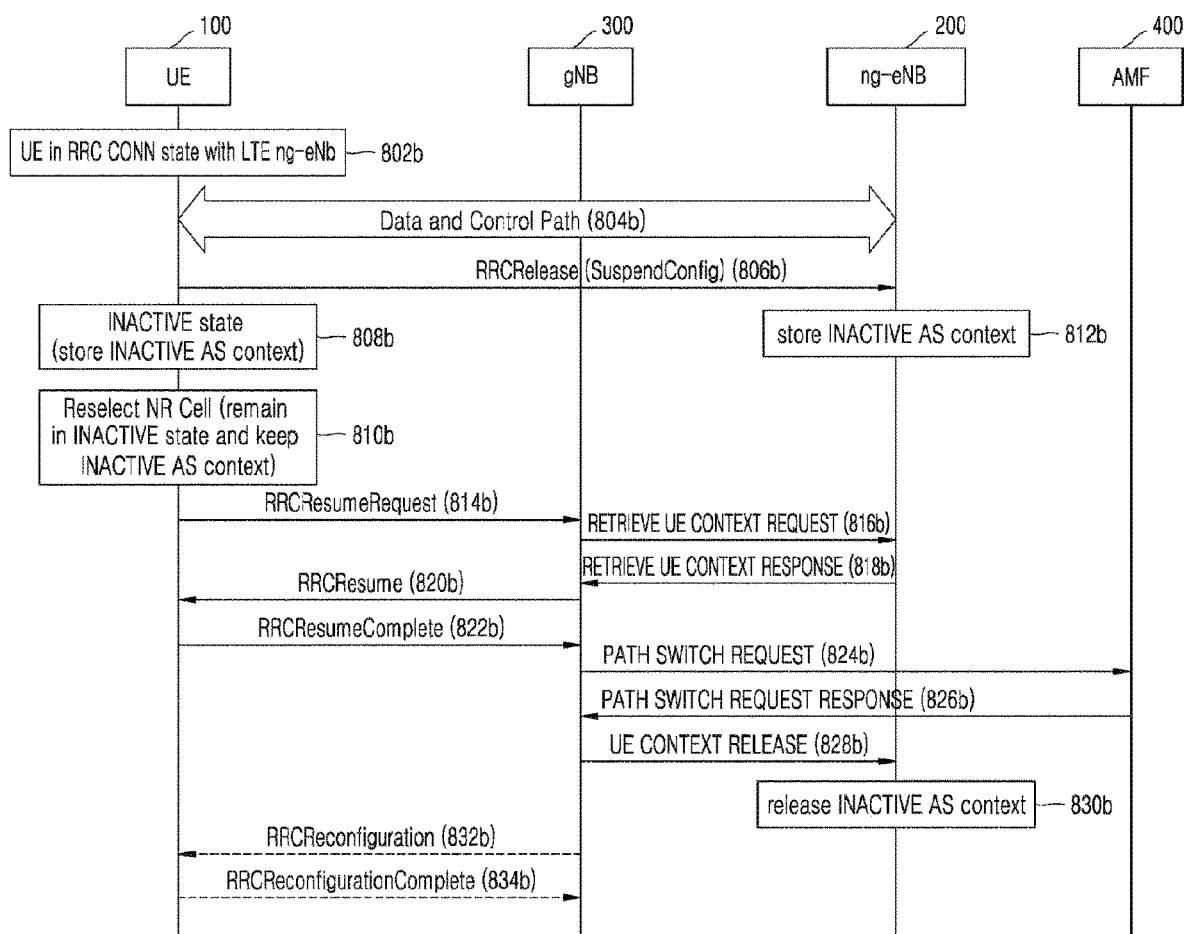
FIG. 8B illustrates the message sequence based on UE when IRAT resume is supported between LTE/5GC and NR/5GC (UE sent to INACTIVE by LTE cell and UE reselects NR cell in INACTIVE state), according to embodiments of the present disclosure.

FIG. 8A illustrates a message sequence based on a UE when IRAT resume is supported between NR/5GC and LTE/5GC (UE sent to INACTIVE by NR cell and UE reselects LTE cell in INACTIVE state, according to embodiments of the present disclosure.

As shown in the FIG. 8A, at 802a, the UE (100) may be in the RRC CONN state with NR gNb. At 804a, the data and control path may be established between the UE (100) and the last serving gNB (300). The last serving gNB (300) may send the RRC Release (SuspendConfig) to the UE (100) at 806a. At 808a, the UE (100) may determine that inactive state (i.e., store INACTIVE AS context). At 810a, the UE (100) may re-select the LTE cell (i.e., UE (100) remains in INACTIVE state and keeps INACTIVE AS context).

At 814a, the UE (100) may send the RRC resume request to the ng-eNB (200). At 816a, the ng-eNB (200) may send the retrieve UE context request to the last serving gNB (300). Based on the retrieve UE context request, the last serving gNB (300) may send the retrieve UE context response to the ng-eNB 200 at 818a. At 820a, the ng-eNB (200) may send the RRC resume to the UE (100). At 822a, the UE (100) may send the RRC resume complete to the ng-eNB (200).

At 824a, the ng-eNB (200) may send a path switch request to the AMF (400). At 826a, the AMF (400) may send a path switch request response to the ng-eNB (200). At 828a, the ng-eNB (200) may send the UE context release to the last serving gNB (300). At 830a, the last serving gNB (300) may release the inactive AS context. At 832a, the ng-eNB (200) may send the RRC reconfiguration to the UE (100). At 834a, the UE (100) may send the RRC reconfiguration complete to the ng-eNB (200).

FIG. 8B illustrates the message sequence based on UE when IRAT resume is supported between LTE/5GC and NR/5GC (UE sent to INACTIVE by LTE cell and UE reselects NR cell in INACTIVE state), according to embodiments of the present disclosure.

As shown in the FIG. 8B, at 802b, the UE (100) may be in the RRC CONN state with LTE ng-eNb. At 804b, the data and control path may be established between the UE (100) and the last serving ng-eNb (200). The last serving gNB (300) may send the RRC Release (SuspendConfig) to the UE (100) at 806b. At 808b, the UE (100) may determine that inactive state (i.e., store INACTIVE AS context). At 810b, the UE (100) may re-select the NR cell (i.e., UE (100) remains in INACTIVE state and keeps INACTIVE AS context).

At 814b, the UE (100) may send the RRC resume request to the gNB (300). At 816b, the gNB (300) may send the retrieve UE context request to the last serving ng-eNb (200). Based on the retrieve UE context request, the last serving ng-eNb (200) may send the retrieve UE context response to the gNB (300) at 818b. At 820b, the gNB (300) may send the RRC resume to the UE (100). At 822b, the UE (100) may send the RRC resume complete to the gNB (300).

At 824b, the gNB (300) may send a path switch request to the AMF (400). At 826b, the AMF (400) may send a path switch request response to the gNB (300). At 828b, the gNB (300) may send the UE context release to the last serving ng-eNb (200). At 830a, the last serving ng-eNb (200) may release the inactive AS context. At 832b, the gNB (300) may send the RRC reconfiguration to the UE (100). At 834b, the UE (100) may send the RRC reconfiguration complete to the gNB (300).

Figure 9:
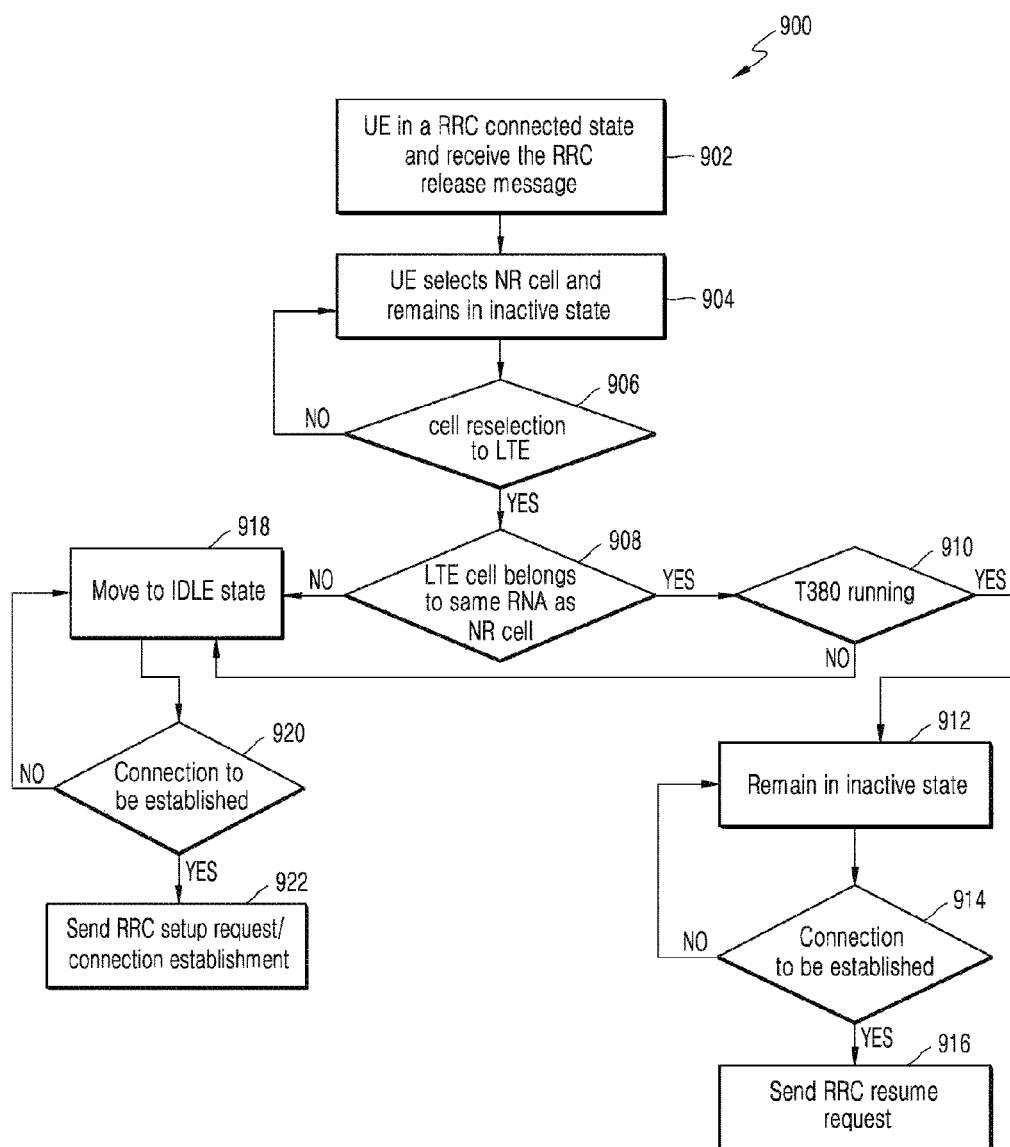
FIG. 9 illustrates a UE procedure for handling an inactive state during a IRAT resume procedure, according to embodiments of the present disclosure.

FIG. 9 illustrates a UE procedure for handling an inactive state during a IRAT resume procedure, according to embodiments of the present disclosure.

As shown in the FIG. 9, at 902, the UE (100) may be in the RRC connected state and receive the RRC release message. At 904, the UE (100) may select the NR cell and remain in an inactive state. At 906, the method may include determining whether the cell reselects to the LTE. If the cell is reselected to the LTE then, at 908, the method may include determining whether the LTE cell belongs to same RNA as the NR cell. If the cell is not reselected to the LTE then, the UE may perform operation 906. If the LTE cell belongs to the same RNA as the NR cell then, at 910, the method may include determining whether T380 is running. If T380 is not running then, at 918, the UE (100) may move to an IDLE state. If T380 is running then, at 912, the UE (100) may remain in the inactive state. At 914, the method may include determining whether the connection to be established. If the connection to be established then, at 916, the method may include sending the RRC resume request. At 920, the method may include determining whether the connection to be established. If the connection to be established then, at 922, the method may include sending RRC setup request/connection establishment. If the connection to be established is not occurred then, at 918, the UE (100) may move to the IDLE state.

Figure 10A:
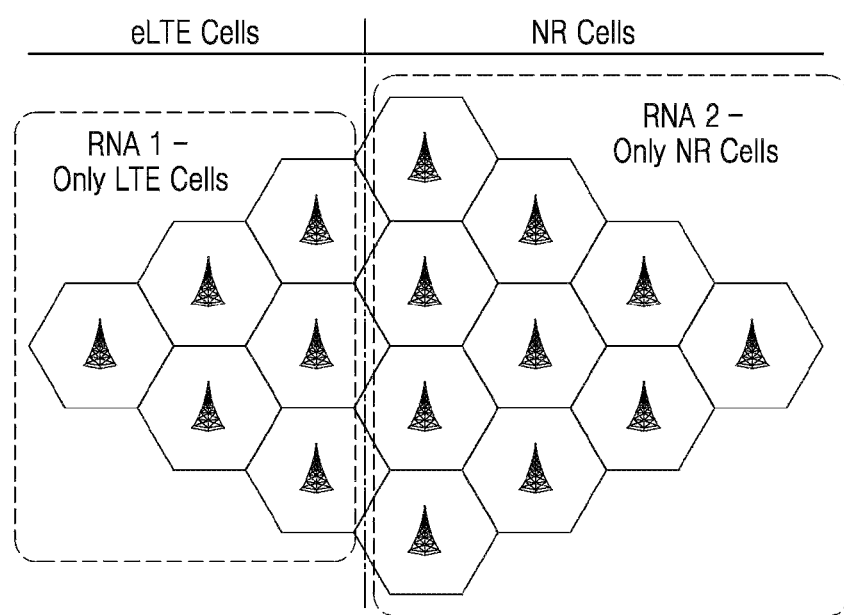
FIG. 10A illustrates a RAN notification area which is limited to one RAT and both LTE and NR cells cannot belong to the same RAN notification area, according to embodiments of the present disclosure.
Figure 10B:
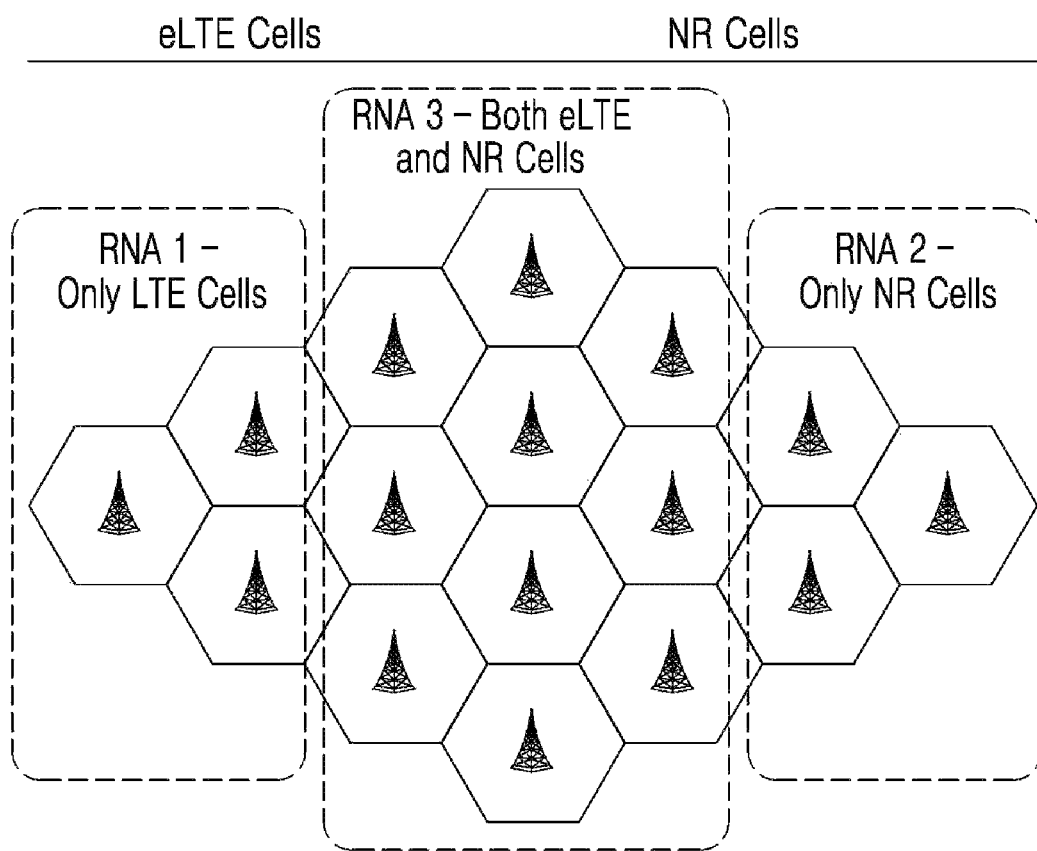
FIG. 10B illustrates the proposed RAN area which may cover few cells from NR RAT and few cells from LTE RAT in addition to the NR only cells based RAN area or eLTE only cells based RAN area, according to embodiments of the present disclosure.

Method to Configure RAN Notification Area (RNA) Across Different RATs:

FIG. 10B illustrates the proposed RAN area which may cover few cells from NR RAT and few cells from LTE RAT in addition to the NR only cells based RAN area or eLTE only cells based RAN area, according to embodiments of the present disclosure.

FIG. 10B illustrates the proposed RAN area which may cover few cells from NR RAT and few cells from LTE RAT in addition to the NR only cells based RAN area or eLTE only cells based RAN area, according to embodiments of the present disclosure.

In current specifications, RRC INACTIVE state may be supported in both LTE and NR. However, the RAN notification area may be limited to one RAT and both LTE and NR cells cannot belong to the same RAN notification area as illustrated in FIG. 10A. In order to support inter-RAT RRC resume procedures as illustrated earlier, it may be imperative that the RAN area is same between the NR cell on which UE entered INACTIVE state and the LTE cell on which UE is attempting to RESUME RRC connection (or vice versa). Therefore, the RAN area may have to be enhanced to support cells belonging to both the RATs. The proposed RAN area may cover few cells from NR RAT and few cells from LTE RAT in addition to the NR only cells based RAN area or eLTE only cells based RAN area as supported in the current specifications as illustrated in FIG. 10B.

Additionally, the periodic RAN update procedure (RNAU) shall also be supported across the RATs and cells that belong to a same RAN notification area. Therefore, the timer T380 received in RRC connection release message that moves the UE from RRC CONNECTED state to RRC INACTIVE state may have to be applied to the new RAT if IRAT reselection is performed to a cell belonging to same RNA. Therefore, when IRAT reselection is performed to an inter RAT cells that belongs to the same RNA, the UE may continue the remaining timer value of T380 on the new RAT (i.e. the remaining value of T380 from NR is inherited by T380 on eLTE).

Figure 11:
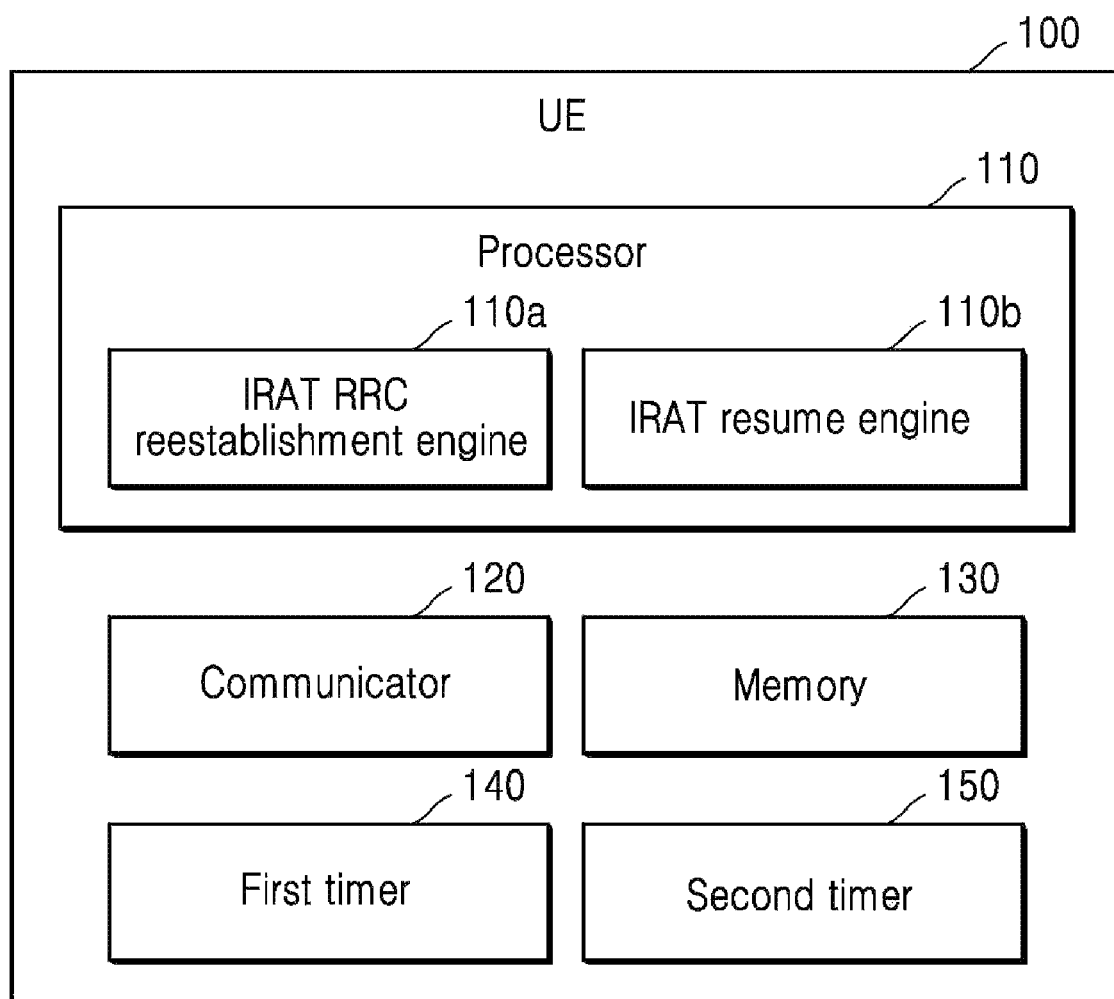
FIG. 11 is schematic view of a UE for handling a RLF in a wireless communication system, according to embodiments of the present disclosure.

FIG. 11 is schematic view of a UE for handling a RLF in a wireless communication system, according to embodiments of the present disclosure.

As shown in the FIG. 11, here after, the label of the wireless communication system may be 1000. The UE (100) can be, for example but not limited to a Unmanned Aerial Vehicle (UAV), an airplane, a cellular phone, a tablet, a smart phone, a laptop, a Personal Digital Assistant (PDA), a global positioning system, a multimedia device, a video device, an internet of things (IoT) device, a smart watch, a game console, or the like. The UE (100) may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. In an embodiment, the UE (100) may include a processor (110), a communicator (120), a memory (130), a first timer (140) and a second timer (150), where the processor (110) includes an IRAT RRC reestablishment engine (110a) and an IRAT resume engine (110b). The processor (110) may be coupled with the communicator (120), the memory (130), and the timers (140 and 150). The first timer (140) may be T311 and the second timer (150) may be T380.

In an embodiment, the processor (110) may detect the RLF at the UE (100) associated with the first cell in the wireless communication system (1000). The first cell may be associated with the first RAT. Further, the processor (110) may select the second cell in the wireless communication system (1000) by performing the cell selection procedure in response to detecting the RLF at the UE (100) associated with the first cell in the wireless communication system (1000). The second cell may be associated with the second RAT. In an embodiment, the first RAT may be a 5G RAT and the second RAT may be a 4G RAT. In another embodiment, the first RAT may be a 4G RAT and the second RAT may be a 5G RAT.

Further, the processor (110) may detect that a 5GC is connected. Further, the processor (110) may determine whether the timer (140) is running in the UE (100) on the second RAT. The timer may be configured and started on the first RAT and the timer may be continued or expired on the second RAT. Therefore, T311 on second RAT should inherit the remainder of time from T311 running of first RAT. If on second RAT, it T311 is still running, then UE can initiate re-establishment request. In an embodiment, the IRAT RRC reestablishment engine (110a) may perform the IRAT RRC re-establishment procedure on the second cell when the RLF is occurred on the first cell associated with the first RAT in response to determining that the timer (140) is running in the UE (100). The timer (140) can be the T311. The UE (100) may inherit a remaining value of the timer (140), on the second cell, from the first cell.

In an embodiment, detecting, by the processor (110), that the 5GC is connected may include determining that the second cell is connected to the 5GC when the first RAT is the 5G RAT and the second RAT is the 4G RAT.

In another embodiment, detecting, by the processor (110), that the 5GC is connected may include determining that the first cell on which the RLF occurred is connected to the 5GC when the first RAT is the 4G RAT and the second RAT is the 5G RAT.

In an embodiment, performing the IRAT RRC re-establishment procedure on the second cell may include sending, by the UE, a RRC re-establishment request message, wherein the RRC re-establishment request message may include a RAT type identifier to indicate the RAT on which the UE encountered the RLF, identifying, by the second cell, the first RAT based on the RAT type indicated by the UE (100), sending, by the second cell, a retrieve UE context request message for retrieving a UE context to the first cell, and receiving, by the second cell, an a retrieve UE context response message including the retrieved UE context from the first cell based on the RRC re-establishment request message.

In another embodiment, the processor (110) may be configured to receive a RRC release message from the network indicating transition to the inactive state of the UE (100) that is associated with a first cell in the wireless communication system (1000). The first cell may be associated with the first RAT. Further, the processor (110) may be configured to select the second cell in the wireless communication system (1000) by performing a cell reselection procedure while the UE (100) is in the inactive state associated with the first cell in the wireless communication system (1000). The second cell may be associated with the second RAT. In an embodiment, the first RAT may be a 5G RAT and the second RAT may be a 4G RAT. In another embodiment, the first RAT may be a 4G RAT and the second RAT may be a 5G RAT. Further, the processor (110) may be configured to determine that the first cell and the second cell belong to a same RAN notification area. Further, the processor (110) may be configured to perform an IRAT resume procedure on the second RAT in the same RAN notification area based on the cell reselection procedure when the inactive state of the UE (100) is occurred on the first cell associated with the first RAT.

In an embodiment, the UE (100) may remain in the inactive state by determining that the first cell and the second cell belong to the same RAN notification area.

In an embodiment, the IRAT resume procedure may be performed by determining that the timer (150) is running in the UE (100), sending, by the UE (100), a RRC resume request to the second cell in response to determining that the timer (140) is running in the UE (100), sending, by the second cell, a retrieve UE context request to the first cell based on the RRC resume request, sending, by the first cell, a retrieve UE context response to the second cell based on the UE context request, sending, by the second cell, the RRC resume to the UE (100), and sending, by the UE (100), the RRC resume complete to the second cell. The timer (150)

can be the T380. In an embodiment, the UE (100) may inherit a remaining value of the timer (150), on the second cell, from the first cell.

In an embodiment, the first cell and the second cell from the first RAT and the second RAT may belong to the same RAN notification area if the first cell and the second cell are connected to 5GC.

In an embodiment, the IRAT resume procedure may indicate that the UE (100) does not go to an idle state and does not discard inactive AS context associated with the first cell on selecting the second cell.

The processor (110) may be configured to execute instructions stored in the memory (130) and to perform various processes. The communicator (120) may be configured for communicating internally between internal hardware components and with external devices via one or more networks and/or gNB (300) and the ng-eNB (200).

The memory (130) may store instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

Although the FIG. 11 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the disclosure. One or more components can be combined together to perform same or substantially similar function to handle the RLF/the inactive state of the UE (100) in the wireless communication system (1000).

Figure 12:
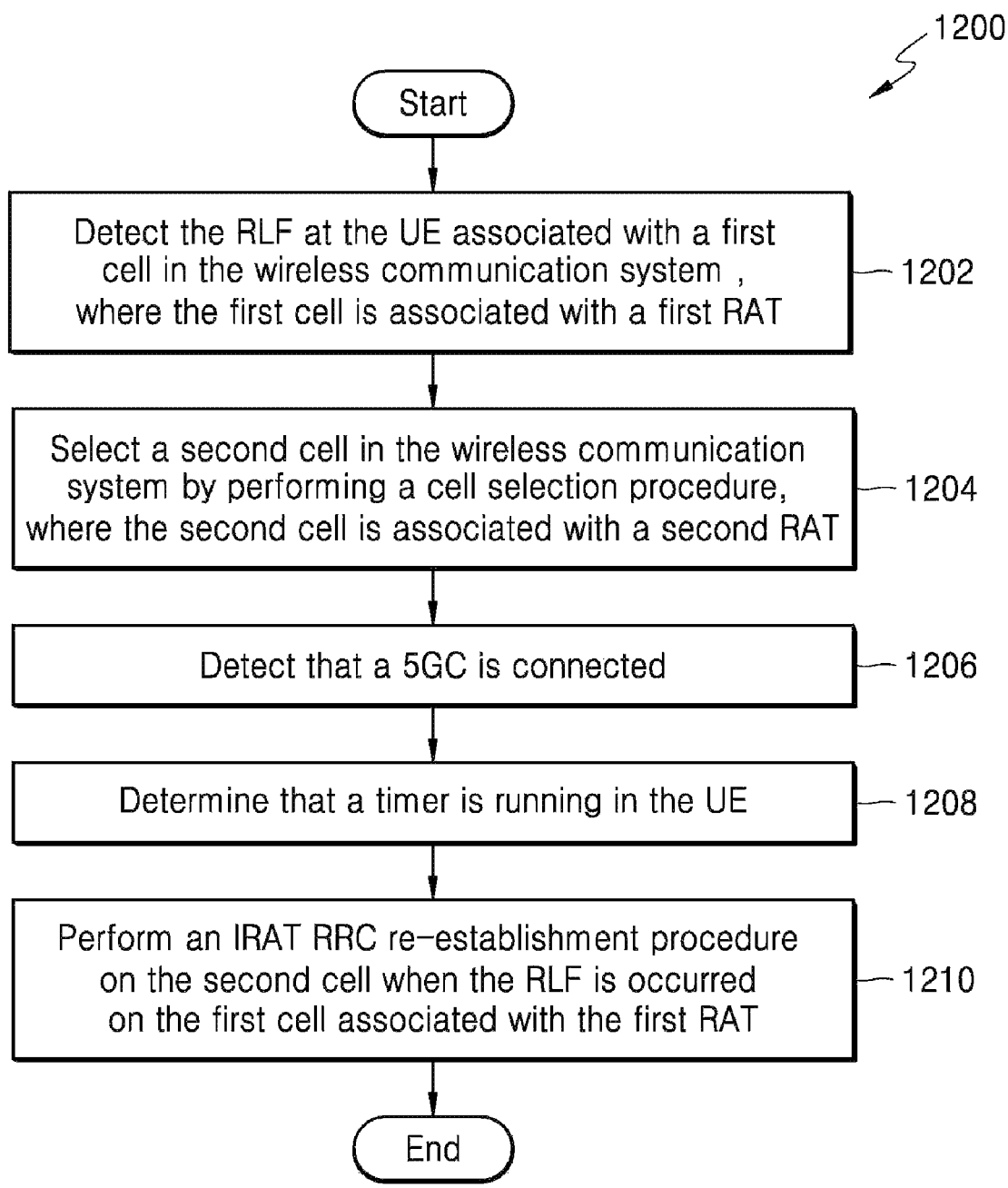
FIG. 12 is a flow chart illustrating a method, implemented by the UE, for handling the RLF in the wireless communication system, according to embodiments of the present disclosure.

FIG. 12 is a flow chart (1200) illustrating a method, implemented by the UE (100), for handling the RLF in the wireless communication system (1000), according to embodiments of the present disclosure.

As shown in FIG. 12, the operations (1202-1210) may be performed by the processor (110). At 1202, the method may include detecting the RLF at the UE (100) associated with the first cell in the wireless communication system (1000). The first cell may be associated with the first RAT. At 1104, the method may include selecting the second cell in the wireless communication system (1000) by performing the cell selection procedure in response to detecting the RLF at the UE (100) associated with the first cell in the wireless communication system (1000). The second cell may be associated with a second RAT. At 1206, the method may include detecting that the 5GC is connected. At 1208, the method may include determining that the timer (140) is running in the UE (100). In response to determining that the timer (140) is running in the UE (100), at 1210, the method may include performing the IRAT RRC re-establishment procedure on the second cell when the RLF is occurred on the first cell associated with the first RAT.

Figure 13:
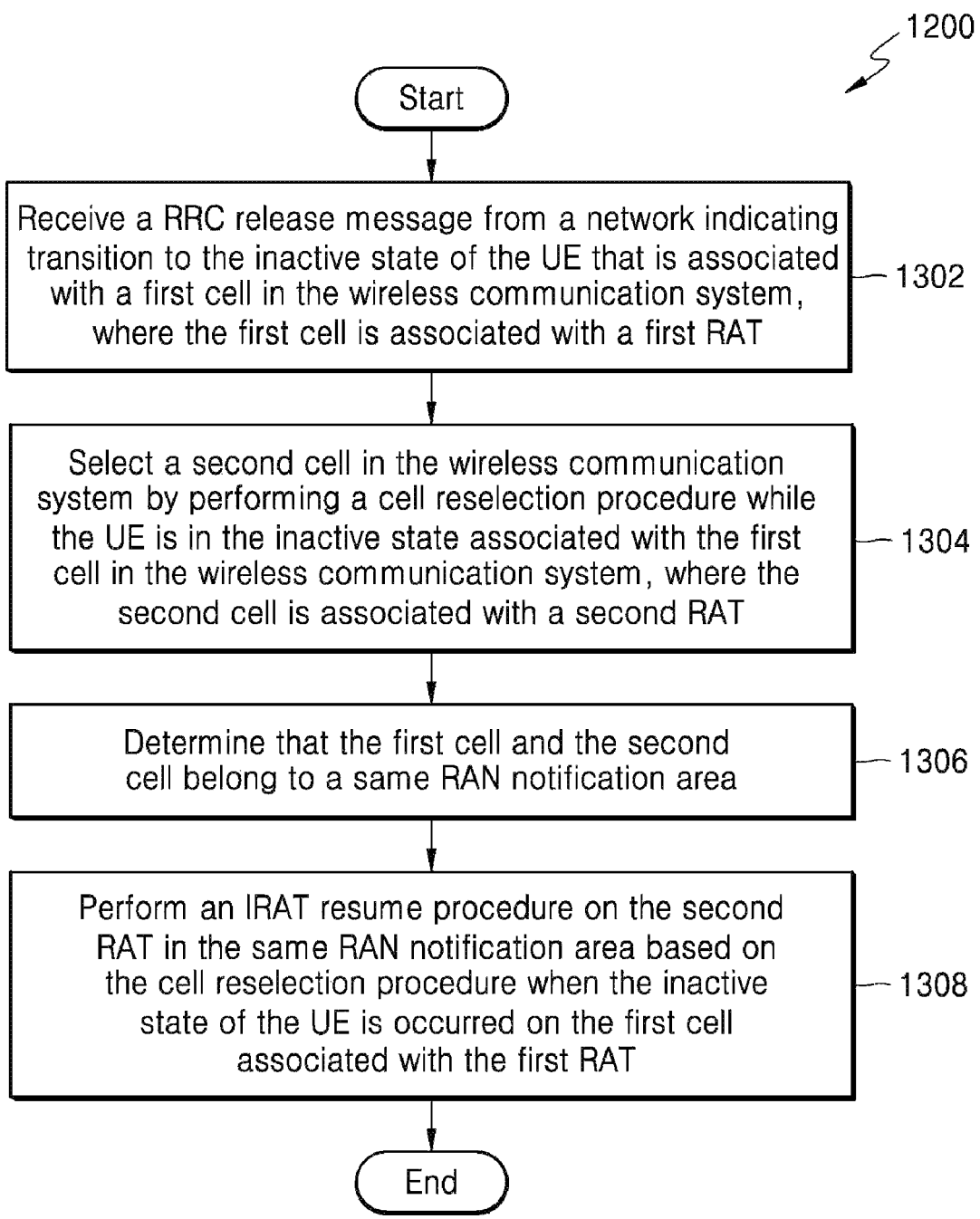
FIG. 13 is a flow chart illustrating a method, implemented, by the UE, for handling an inactive state of the UE, according to embodiments of the present disclosure.

FIG. 13 is a flow chart (1300) illustrating a method, implemented by the UE, for handling the inactive state of the UE (100) in the wireless communication system (1000), according to embodiments of the present disclosure.

As shown in FIG. 13, the operations (1302-1308) may be performed by the processor (110). At 1302, the method may include receiving a RRC release message from a network indicating transition to the inactive state of the UE (100) that is associated with the first cell in the wireless communication system (1000). The first cell may be associated with the first RAT. At 1304, the method may include selecting the second cell in the wireless communication system (1000) by performing a cell reselection procedure while the UE (100) is in the inactive state associated with the first cell in the wireless communication system (1000). The second cell may be associated with the second RAT. At 1306, the method may include determining that the first cell and the second cell belong to a same RAN notification area. At 1308, the method may include performing an IRAT resume procedure on the second RAT in the same RAN notification area based on the cell reselection procedure when the inactive state of the UE (100) is occurred on the first cell associated with the first RAT.

Figure 14:
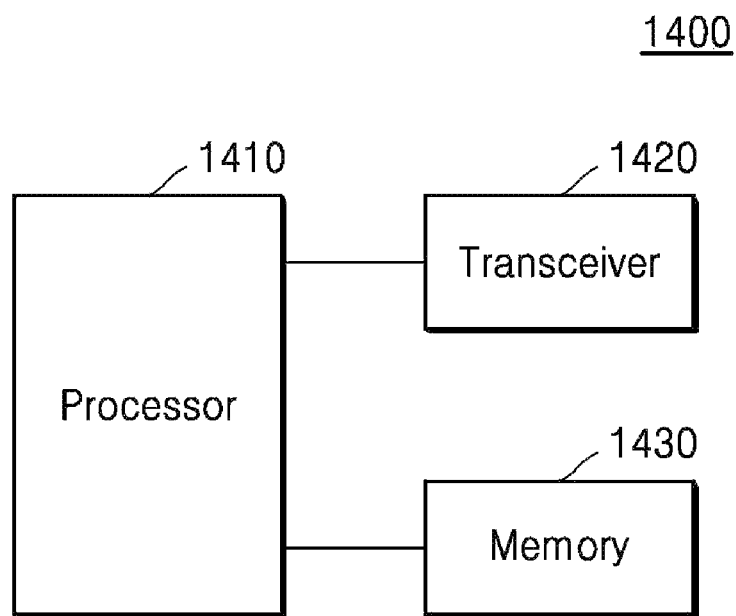
FIG. 14 illustrates a base station (BS) according to embodiments of the present disclosure.

FIG. 14 illustrates a base station (BS) according to embodiments of the present disclosure.

The gNBs, eNBs, ng-eNB, or BSs described above may correspond to the BS 1400. For example, the eNB 600*a*, the eNB 600*b*, the gNB 300 or ng-eNB 200 illustrated in FIG. 1A or the gNB 300*a*, the ng-eNB 200*a*, ng-eNB 200*b*, or gNB 300*b* illustrated in FIG. 2A may correspond to the BS 1400.

Referring to the FIG. 14, the BS 1400 may include a processor 1410, a transceiver 1420 and a memory 1430. However, all of the illustrated components are not essential. The BS 1400 may be implemented by more or less components than those illustrated in FIG. 14. In addition, the processor 1410 and the transceiver 1420 and the memory 1430 may be implemented as a single chip according to another embodiment.

The aforementioned components will now be described in detail.

The processor 1410 may include one or more processors or other processing devices that control the proposed function, process, and/or method. Operation of the BS 1400 may be implemented by the processor 1410.

The transceiver 1420 may include a RF transmitter for up-converting and amplifying a transmitted signal, and a RF receiver for down-converting a frequency of a received signal. However, according to another embodiment, the transceiver 1420 may be implemented by more or less components than those illustrated in components.

The transceiver 1400 may be connected to the processor 1410 and transmit and/or receive a signal. The signal may include control information and data. In addition, the transceiver 1420 may receive the signal through a wireless channel and output the signal to the processor 1410. The transceiver 1420 may transmit a signal output from the processor 1410 through the wireless channel.

The memory 1430 may store the control information or the data included in a signal obtained by the BS 1400. The memory 1430 may be connected to the processor 1410 and store at least one instruction or a protocol or a parameter for the proposed function, process, and/or method. The memory 1430 may include read-only memory (ROM) and/or random access memory (RAM) and/or hard disk and/or CD-ROM and/or DVD and/or other storage devices.

Figure 15:
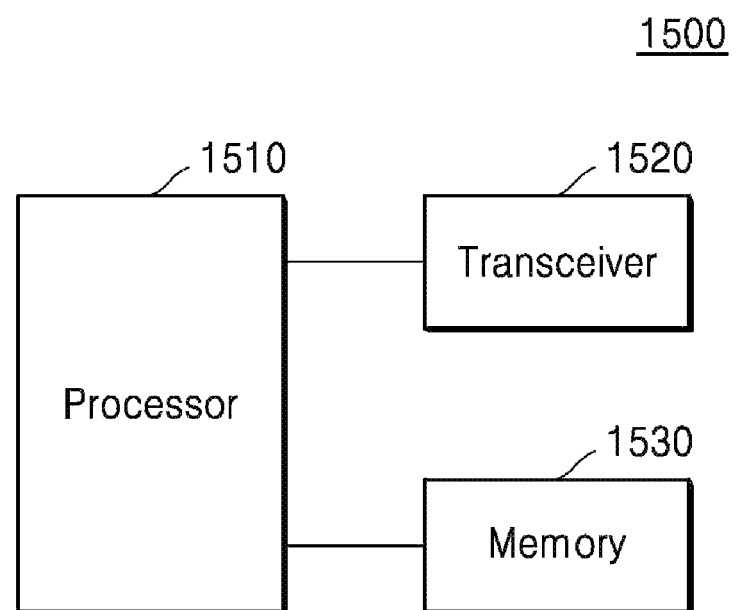
FIG. 15 illustrates a user equipment (UE) according to embodiments of the present disclosure.

FIG. 15 illustrates a user equipment (UE) according to embodiments of the present disclosure.

The UEs described above may correspond to the UE 1500. For example, the UE 100 illustrated in FIG. 11 may correspond to the UE 1500.

Referring to the FIG. 15, the UE 1500 may include a processor 1510, a transceiver 1520 and a memory 1530. However, all of the illustrated components are not essential. The UE 1500 may be implemented by more or less components than those illustrated in FIG. 15. In addition, the processor 1510 and the transceiver 1520 and the memory 1530 may be implemented as a single chip according to another embodiment.

The aforementioned components will now be described in detail.

The processor 1510 may include one or more processors or other processing devices that control the proposed function, process, and/or method. Operation of the UE 1500 may be implemented by the processor 1510.

In one embodiment, the processor 1510 may detect the RLF at the UE (100) associated with a first cell in the wireless communication system (1000), wherein the first cell is associated with a first RAT. In addition, the processor 1510 may select a second cell in the wireless communication system (1000) by performing a cell selection procedure in response to detecting the RLF at the UE (100) associated with the first cell in the wireless communication system (1000), wherein the second cell is associated with a second RAT. The processor 1510 may detect that a fifth generation core (5GC) is connected and determine that a timer (140) is running in the UE (100) on the second RAT. In response to determine that the timer (140) is running in the UE (100) on the second RAT, the processor 1510 may perform an Inter Radio Access Technology (IRAT) Radio Resource Control (RRC) re-establishment procedure on the second cell when the RLF is occurred on the first cell associated with the first RAT.

In another embodiment, the processor 1510 may receive a RRC release message from a network indicating transition to the inactive state of the UE (100) that is associated with a first cell in the wireless communication system (1000), wherein the first cell is associated with a first RAT. In addition, the processor 1510 may select a second cell in the wireless communication system (1000) by performing a cell reselection procedure while the UE (100) is in the inactive state associated with the first cell in the wireless communication system (1000), wherein the second cell is associated with a second RAT. The processor 1510 may determine that the first cell and the second cell belong to a same Radio Access Network (RAN) notification area, and the processor 1510 may perform an IRAT resume procedure on the second RAT in the same RAN notification area based on the cell reselection procedure when the inactive state of the UE (100) is occurred on the first cell associated with the first RAT.

The transceiver 1520 may include a RF transmitter for up-converting and amplifying a transmitted signal, and a RF receiver for down-converting a frequency of a received signal. However, according to another embodiment, the transceiver 1520 may be implemented by more or less components than those illustrated in components.

The transceiver 1500 may be connected to the processor 1510 and transmit and/or receive a signal. The signal may include control information and data. In addition, the transceiver 1520 may receive the signal through a wireless channel and output the signal to the processor 1510. The transceiver 1520 may transmit a signal output from the processor 1510 through the wireless channel.

The memory 1530 may store the control information or the data included in a signal obtained by the UE 1500. The memory 1530 may be connected to the processor 1510 and store at least one instruction or a protocol or a parameter for the proposed function, process, and/or method. The memory 1530 may include read-only memory (ROM) and/or random access memory (RAM) and/or hard disk and/or CD-ROM and/or DVD and/or other storage devices.

The various actions, acts, blocks, steps, or the like in the flow charts (1200 and 1300) may be performed in the order presented, in a different order or simultaneously. Further, in some embodiments, some of the actions, acts, blocks, steps, or the like may be omitted, added, modified, skipped, or the like without departing from the scope of the disclosure.

The embodiments herein are applicable for LTE, NR and other cellular communication technologies and the reference to any one of these technologies in the disclosure is only for the purpose of illustration and not restricted by it.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a user equipment (UE), for handling a radio link failure (RLF) in a wireless communication system, the method comprising:
   detecting the RLF at the UE associated with a first cell in the wireless communication system, wherein the first cell is associated with a first Radio Access Technology (RAT);
   selecting a second cell in the wireless communication system by performing a cell selection procedure in response to detecting the RLF at the UE associated with the first cell in the wireless communication system, wherein the second cell is associated with a second RAT;
   detecting that a fifth generation core (5GC) is connected;
   determining that a timer is running, in the UE, on the second RAT; and
   in response to determining that the timer is running in the UE on the second RAT, performing an Inter Radio Access Technology (IRAT) Radio Resource Control (RRC) re-establishment procedure on the second cell when the RLF is occurred on the first cell associated with the first RAT,
   wherein the UE inherits a remaining value of the timer, on the second cell, from the first cell, and wherein the timer is configured and started on the first RAT.

2. The method of claim 1, wherein each of the first RAT and the second RAT is one of a 4G RAT and a 5G RAT.

3. The method of claim 1, wherein detecting that the 5GC is connected comprises determining that the second cell is connected to the 5GC when the first RAT is a 5G RAT and the second RAT is a 4G RAT.

4. The method of claim 1, wherein detecting that the 5GC is connected comprises determining that the first cell on which the RLF occurred is connected to the 5GC when the first RAT is a 4G RAT and the second RAT is a 5G RAT.

5. The method of claim 1, wherein performing the IRAT RRC re-establishment procedure on the second cell comprises:
- sending an RRC re-establishment request message to the second cell, wherein the RRC re-establishment request message comprises a RAT type identifier to indicate the RAT on which the UE encountered the RLF, and wherein the second cell identifies the first RAT based on the RAT type indicated by the UE;
- sending a retrieve UE context request message for retrieving a UE context to the first cell; and
- receiving a retrieve UE context response message comprising the retrieved UE context from the first cell based on the RRC re-establishment request message.

6. The method of claim 1, wherein the timer is T311.

7. A User Equipment (UE) for handling a radio link failure (RLF) in a wireless communication system, the UE comprising:
- a transceiver; and
- at least one processor, coupled with the transceiver, configured to:
  - detect the RLF at the UE associated with a first cell in the wireless communication system, wherein the first cell is associated with a first Radio Access Technology (RAT);
  - select a second cell in the wireless communication system by performing a cell selection procedure in response to detecting the RLF at the UE associated with the first cell in the wireless communication system, wherein the second cell is associated with a second RAT;
  - detect that a fifth generation core (5GC) is connected;
  - determine that a timer is running in the UE on the second RAT; and
  - in response to determine that the timer is running in the UE on the second RAT, perform an Inter Radio Access Technology (IRAT) Radio Resource Control (RRC) re-establishment procedure on the second cell when the RLF is occurred on the first cell associated with the first RAT, and
- wherein the UE inherits a remaining value of the timer, on the second cell, from the first cell, and wherein the timer is configured and started on the first RAT.

8. The UE of claim 7, wherein the first RAT is a 5G RAT and the second RAT is a 4G RAT.

9. The UE of claim 7, wherein the first RAT is a 4G RAT and the second RAT is a 5G RAT.

10. The UE of claim 7, wherein the at least one processor is configured to determine that the second cell is connected to the 5GC when the first RAT is a 5G RAT and the second RAT is a 4G RAT.

11. The UE of claim 7, wherein the at least one processor is configured to determine that the first cell on which the RLF occurred is connected to the 5GC when the first RAT is a 4G RAT and the second RAT is a 5G RAT.

12. The UE of claim 7, wherein the at least one processor is configured to:
- send an RRC re-establishment request message to the second cell, wherein the RRC re-establishment request message comprises a RAT type identifier to indicate the RAT on which the UE encountered the RLF, and wherein the second cell identifies the first RAT based on the RAT type indicated by the UE;
- send a retrieve UE context request message for retrieving a UE context to the first cell; and
- receive a retrieve UE context response message comprising the retrieved UE context from the first cell based on the RRC re-establishment request message.

13. The UE of claim 7, wherein the timer is a T311.

\* \* \* \* \*